United States Patent
Frascati et al.

(10) Patent No.: US 9,449,410 B2
(45) Date of Patent: Sep. 20, 2016

(54) INTRA-FRAME TIMESTAMPS FOR TILE-BASED RENDERING

(71) Applicant: QUALCOMM Incorporated, San Diego, CA (US)

(72) Inventors: Christopher Paul Frascati, Oviedo, FL (US); Hitendra Mohan Gangani, Orlando, FL (US); Avinash Seetharamaiah, Chuluota, FL (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 14/044,396

(22) Filed: Oct. 2, 2013

(65) Prior Publication Data

US 2014/0306971 A1 Oct. 16, 2014

Related U.S. Application Data

(60) Provisional application No. 61/811,056, filed on Apr. 11, 2013.

(51) Int. Cl.
*G09G 5/00* (2006.01)
*G06F 15/00* (2006.01)
(Continued)

(52) U.S. Cl.
CPC .............. *G06T 11/40* (2013.01); *G06T 1/20* (2013.01); *G06T 11/001* (2013.01); *G06T 15/005* (2013.01); *G06T 15/04* (2013.01)

(58) Field of Classification Search
CPC ....... G06T 11/001; G06T 15/04; G06T 1/20; G06T 15/005; G06T 3/4007; G06T 11/203; G06T 11/60; G06T 3/0093; G06T 9/3017

USPC ....... 345/581, 582, 586, 587, 501, 522, 606, 345/611, 619, 643, 644; 712/245
See application file for complete search history.

(56) References Cited

U.S. PATENT DOCUMENTS 6,323,860 B1    11/2001   Zhu et al.
7,385,608 B1 *  6/2008    Baldwin ................. G06T 1/20
                                                        345/419

(Continued)

FOREIGN PATENT DOCUMENTS

GB    2461900 A    1/2010
WO    0137220 A1   5/2001

OTHER PUBLICATIONS

Response to Written Opinion dated Apr. 21, 2015, from International Application No. PCT/US2014/030447, filed on Jul. 21, 2015, 6 pp.
Second Written Opinion from International Application No. PCT/US2014/030447, dated Aug. 31, 2015, 8 pp.
International Preliminary Report on Patentabilty from International Application No. PCT/US2014/030447, dated Oct. 23, 2015, 9 pp.

(Continued)

*Primary Examiner* — Ke Xiao
*Assistant Examiner* — Andrew Shin
(74) *Attorney, Agent, or Firm* — Shumaker & Sieffert, P.A.

(57) ABSTRACT

This disclosure describes techniques for supporting intra-frame timestamps in a graphics system that performs tile-based rendering. The techniques for supporting intra-frame timestamps may involve generating a timestamp value that is indicative of a point in time based on a plurality of per-bin timestamp values that are generated by a graphics processing unit (GPU) while performing tile-based rendering for a graphics frame. The timestamp value may be a function of at least two of the plurality of per-bin timestamp values. The timestamp value may be generated by a central processing unit (CPU), the GPU, another processor, or any combination thereof. By using per-bin timestamp values to generate timestamp values for intra-frame timestamp requests, intra-frame timestamps may be supported by a graphics system that performs tile-based rendering.

42 Claims, 6 Drawing Sheets

(51) Int. Cl.
  *G06T 1/00* (2006.01)
  *G06T 11/40* (2006.01)
  *G06T 1/20* (2006.01)
  *G06T 15/04* (2011.01)
  *G06T 11/00* (2006.01)
  *G06T 15/00* (2011.01)

(56) References Cited

U.S. PATENT DOCUMENTS

2005/0285850 A1* 12/2005 Heim .................. G06T 15/005
                                                        345/418
2009/0141033 A1   6/2009  Street
2012/0147027 A1   6/2012  Molnar et al.
2012/0236011 A1   9/2012  Diesi

OTHER PUBLICATIONS

International Search Report and Written Opinion from International Application No. PCT/US2014/030447, dated Apr. 21, 2015, 11 pp.

"OpenGL Timer Query" Lighthouse3D, XP002738165, Retrieved from the Internet: URL: http://www.lighthouse3d.com/tutorials/opengl-short-tutorials/opengl-timer-query/, Jun. 2011, 9 pp.

"OpenGL Timer Query" Lighthouse3D, XP002738165, Retrieved from the Internet: URL: http://www.lighthouse3d.com/tutorials/opengl-short-tutorials/opengl-timer-query/, Jun. 2011, 9 pp. [clean version].

Merry, "Performance Tuning for Tile-Based Architectures", In: "OpenGL Insights", Jul. 2012, Taylor & Francis Group, LLC ISBN: 9781439893777, pp. 323-335.

* cited by examiner

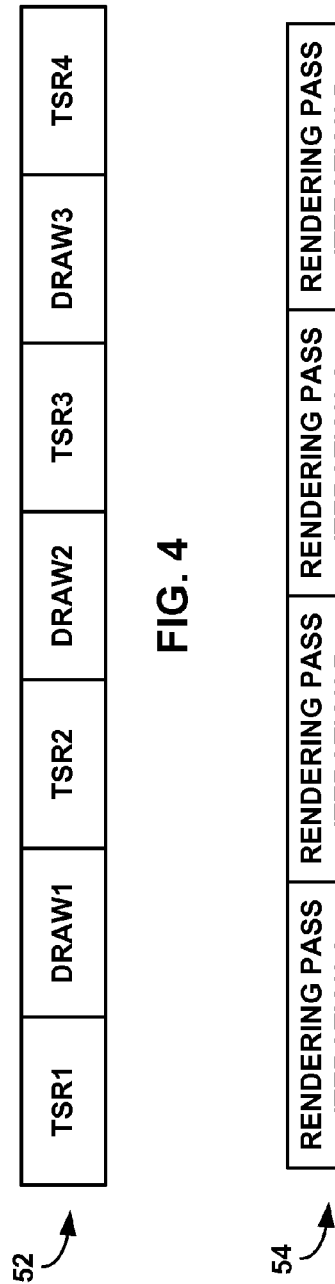
FIG. 4
FIG. 5
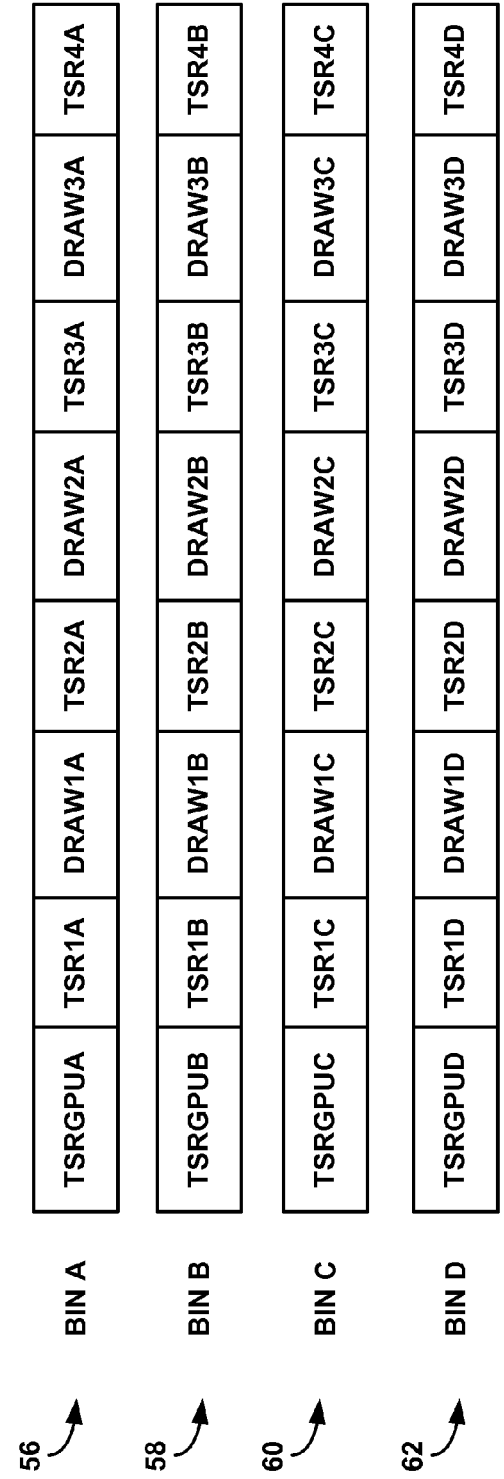
FIG. 6

INTRA-FRAME TIMESTAMPS FOR TILE-BASED RENDERING

This application claims the benefit of U.S. Provisional Application No. 61/811,056, filed Apr. 11, 2013, the entire content of which is incorporated herein by reference.

TECHNICAL FIELD

This disclosure relates to graphics processing systems, and more particularly, to using timestamps in a graphics processing system.

BACKGROUND

Computing devices often utilize a graphics processing unit (GPU) to accelerate the rendering of graphics data for display. Such computing devices may include, e.g., computer workstations, mobile phones (e.g., so-called smartphones), embedded systems, personal computers, tablet computers, and video game consoles. Rendering generally refers to the process of converting a three-dimensional (3D) graphics scene, which may include one or more 3D graphics objects, into two-dimensional (2D) rasterized image data. A graphics scene may be rendered as a sequence of one or more frames where each frame depicts the graphics scene at a particular instance in time.

A GPU may include a 3D rendering pipeline to provide at least partial hardware acceleration for the rendering of a 3D graphics scene. The 3D graphics objects in a scene may be subdivided by a graphics application into one or more 3D graphics primitives (e.g., points, lines, triangles, patches, etc.), and the GPU may convert the 3D graphics primitives of the scene into 2D rasterized image data for each of the frames to be rendered. Therefore, in the specific context of GPU rendering, rendering may refer to the process of converting 3D graphics primitives that correspond to 3D objects in a graphics scene into 2D rasterized image data.

To render the 3D graphics primitives for a particular frame, a graphics application executing on a host central processing unit (CPU) may place geometry data corresponding to the primitives to be rendered into a GPU-accessible memory, place one or more GPU state set-up commands into the command stream, and place one or more draw calls into the command stream that cause the GPU to render the primitives based on the geometry data. The GPU may process the commands contained in the command stream in the order in which the commands were placed in the command stream, thereby rendering the scene.

SUMMARY

This disclosure describes techniques for supporting intra-frame timestamp requests in a graphics processing system that performs tile-based rendering. Tile-based rendering may involve subdividing a render target (e.g., a frame) into a plurality of bins (e.g., sub-regions or tiles), and performing a separate rendering pass iteration for each of the bins. An intra-frame timestamp request may refer to a timestamp request that can be placed at arbitrary locations in a graphics command stream that is associated with a graphics frame to be rendered. A timestamp request may refer to a request for a timestamp value that is indicative of an instance in time at which the timestamp request is processed by a device (e.g., a GPU or CPU) that processes the timestamp request. The intra-frame timestamp generation techniques of this disclosure may generate application-requested timestamp values based on one or more per-bin timestamp values that are generated by a graphics processing unit (GPU) while performing tile-based rendering. Using per-bin timestamp values to generate application-requested timestamp values may allow intra-frame timestamps to be supported by a graphics processing system that performs tile-based rendering.

In one example, this disclosure describes a method that includes generating, with one or more processors, a timestamp value that is indicative of a point in time based on a plurality of per-bin timestamp values that are generated by a GPU while performing tile-based rendering for a graphics frame. The timestamp value may be a function of at least two per-bin timestamp values of the plurality of per-bin timestamp values.

In another example, this disclosure describes a device that includes one or more processors configured to generate a timestamp value that is indicative of a point in time based on a plurality of per-bin timestamp values that are generated by a GPU while performing tile-based rendering for a graphics frame. The timestamp value may be a function of at least two per-bin timestamp values of the plurality of per-bin timestamp values.

In another example, this disclosure describes an apparatus that includes a GPU. The apparatus further includes means for generating a timestamp value that is indicative of a point in time based on a plurality of per-bin timestamp values that are generated by the GPU while performing tile-based rendering for a graphics frame. The timestamp value may be a function of at least two per-bin timestamp values of the plurality of per-bin timestamp values.

In another example, this disclosure describes a computer-readable storage medium storing instructions that, when executed, cause one or more processors to generate a timestamp value that is indicative of a point in time based on a plurality of per-bin timestamp values that are generated by a graphics processing unit (GPU) while performing tile-based rendering for a graphics frame. The timestamp value may be a function of at least two per-bin timestamp values of the plurality of per-bin timestamp values.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a conceptual diagram illustrating an example command stream issued by a graphics application according to this disclosure.

FIG. 5 is a conceptual diagram illustrating an example execution timeline for performing a rendering pass according to this disclosure.

FIG. 6 is a conceptual diagram illustrating example command streams for performing a plurality of rendering pass iterations according to this disclosure.

DETAILED DESCRIPTION

Figure 1:
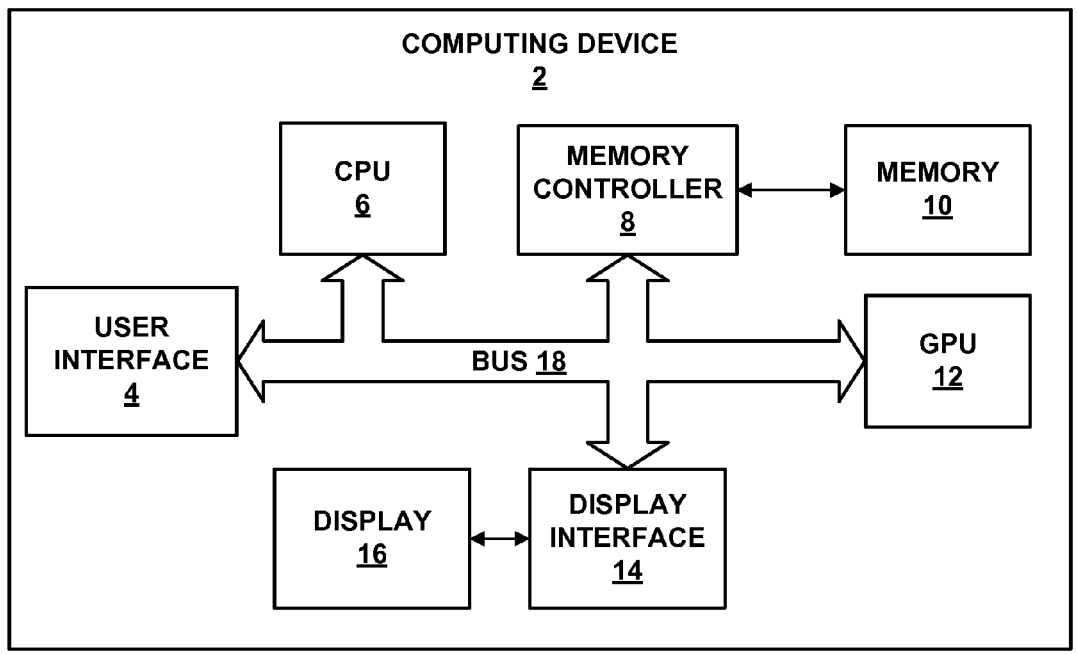
FIG. 1 is a block diagram illustrating an example computing device that may be used to implement the intra-frame timestamp generation techniques of this disclosure.

This disclosure describes techniques for supporting intra-frame timestamp requests in a graphics processing system that performs tile-based rendering. Tile-based rendering may involve subdividing a render target (e.g., a frame) into a plurality of bins (e.g., sub-regions or tiles), and performing a separate rendering pass iteration for each of the bins. An intra-frame timestamp request may refer to a timestamp request that can be placed at arbitrary locations in a graphics command stream that is associated with a graphics frame to be rendered. A timestamp request may refer to a request for a timestamp value that is indicative of an instance in time at which the timestamp request is processed by a device (e.g., a GPU or CPU) that processes the timestamp request. The intra-frame timestamp generation techniques of this disclosure may generate application-requested timestamp values based on one or more per-bin timestamp values that are generated by a graphics processing unit (GPU) while performing tile-based rendering. Using per-bin timestamp values to generate application-requested timestamp values may allow intra-frame timestamps to be supported by a graphics processing system that performs tile-based rendering.

A graphics application that issues an intra-frame timestamp request which is located between two different draw call commands may, for example, expect the timestamp value returned in response to the request to correspond to a time that is between the execution of the first draw call command and the execution of the second draw call command. Tile-based rendering systems, however, may execute draw call commands for a graphics frame in a non-continuous manner, such that the execution of one draw call command is interleaved with the execution of other draw call commands associated with the same graphics frame. For example, a tile-based rendering system may subdivide the execution of the draw call commands associated with a graphics frame to be rendered into a plurality of per-bin draw calls, group the per-bin draw calls together by bin, and execute each of the groups of per-bin draw calls as part of a separate rendering pass iteration. This non-continuous, interleaved manner of executing draw call commands makes it difficult for tile-based rendering systems to support intra-frame timestamps.

The techniques described in this disclosure may allow a tile-based rendering system to support intra-frame timestamps, even in cases where the tile-based rendering system executes draw call commands in a non-continuous, interleaved manner. For example, the intra-frame timestamp generation techniques of this disclosure may generate an application-requested timestamp value based on a plurality of per-bin timestamp values that are generated by a GPU while performing tile-based rendering. At least some of the per-bin timestamp values used to generate application-requested timestamp value may be generated as part of different rendering pass iterations. Using per-bin timestamp values that are generated during different rendering pass iterations may allow a graphics processing system to generate application-requested timestamp values that reflect, at least to some degree, the relative amounts of time taken by different draw call commands to execute during the rendering of a graphics frame. In this way, useful timestamp values may be provided by tile-based rendering systems to graphics applications that employ timing statistics related to the relative amounts of execution time taken by different draw call commands.

As used herein, an application-requested timestamp value may refer to a timestamp value that is generated in response to a timestamp request that is generated by a graphics application (e.g., an application that is above the driver level in a software stack). A per-bin timestamp value may refer to a timestamp value that is generated by a GPU while performing a rendering pass iteration for a particular bin (e.g., sub-region of a render target). A timestamp request that is generated by a graphics application may be referred to as an application-generated timestamp request. In some cases, a per-bin timestamp request may refer to a timestamp request that is generated by a GPU driver or by a GPU (e.g., a software/hardware layer that is below the user-application layer).

In some examples, a GPU driver or other application may generate a plurality of per-bin timestamp requests for each of the application-generated timestamp requests received in a command stream. The per-bin timestamp requests may be serviced by a GPU, which may generate a respective per-bin timestamp value in response to receiving each of the per-bin timestamp requests. The per-bin timestamp value may indicate the time at which the GPU encountered the per-bin timestamp request in a command stream that is executed when performing tile-based rendering. Timestamps and timestamp values that are generated in response to application-generated timestamp requests may be referred to, respectively, as application-requested timestamps and application-requested timestamp values. Similarly, timestamps and timestamp values that are generated in response to per-bin timestamp requests may be referred to, respectively, as per-bin timestamps and per-bin timestamp values.

A graphics application (e.g., an applications executing on a host central processing unit (CPU) that includes instructions that cause a GPU to render one or more graphics frames) may often issue multiple draw call commands in order to render a particular graphics frame. For example, GPUs are typically configured to render a single type of primitive (e.g., point, line, triangle, patch, etc.) with a single set of render state settings for each draw call command to be executed. In such examples, if more than one type of primitive is needed to render a frame or if more than one type of render state is needed to render the frame, then the graphics application may need to issue multiple draw call commands to render a single graphics frame.

To obtain timing statistics for the execution of individual draw call commands or subsets of the draw call commands when multiple draw call commands are used to render a graphics frame, a graphics application may place timestamp requests in between the draw call commands in a command stream that is to be executed by a GPU. Timestamp requests that are placed between the draw call commands which are used to render an individual graphics frame may be referred to herein as intra-frame timestamp requests, and the corresponding timestamps generated in response to such requests may be referred to as intra-frame timestamps.

A graphics application may receive a timestamp in response to each timestamp request that is placed into the command stream. The timestamp may include a timestamp value specifying the time at which the GPU executed the timestamp request. Because graphics command streams are typically executed by a GPU in the order in which the commands are placed into the command stream, a graphics application may expect that, when a timestamp request is placed between two adjacent draw calls in a command stream, the returned timestamp value will correspond to a time that occurs between the execution of a first draw call command and the execution of a second draw call command.

Timestamp values that satisfy the above-mentioned expectation may allow a graphics application, for example, to perform various timestamp processing techniques. For example, such timestamp values may be used to determine an approximate execution time for a draw call command by taking the difference between timestamp values that are returned in response to timestamp requests that are placed in the command stream prior to and subsequent to the draw call command.

Tile-based rendering may, in some examples, involve subdividing a render target (e.g., a frame) into a plurality of sub-regions (e.g., bins or tiles), and performing a rendering pass that includes a separate rendering pass iteration for each of the sub-regions of the render target. To perform the separate rendering pass iterations, a tile-based rendering system may subdivide the execution of the draw call commands associated with a graphics frame to be rendered into a plurality of per-bin draw calls, and group the per-bin draw calls together by bin. Each of groups of per-bin draw calls may be executed as part of a separate rendering pass iteration.

If a graphics frame to be rendered includes multiple draw calls, then the execution of the per-bin draw calls associated with one draw call command may be interleaved with the execution of the per-bin draw calls associated with other draw call commands for the same graphics frame. As discussed above, however, some types of timestamp processing techniques may assume that the draw call commands are executed in a continuous fashion and in the order that the graphics commands are placed in the command stream. The interleaved execution of draw call commands that occurs when performing tile-based rendering may make it difficult to provide useful intra-frame timestamps for such timestamp processing techniques.

The techniques of this disclosure may be used to generate intra-frame timestamps even when draw call commands are executed in an interleaved manner due to the performance of tile-based rendering techniques. In some examples, the intra-frame timestamp values generated according to this disclosure may mimic or approximate timestamp values that would be obtained if continuous, in-order draw call processing were performed (even though the draw calls may actually be executed in an interleaved fashion) while at the same time providing timestamp values that are indicative of the relative amounts of execution time that took place for the draw call commands in a command stream. In this way, the timestamp values may be used with timestamp processing techniques that assume that draw call commands are executed in a continuous fashion and in the order that the graphics commands are placed in the command stream.

FIG. 1 is a block diagram illustrating an example computing device 2 that may be used to implement the intra-frame timestamp generation techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a display interface 14, a display 16 and a bus 18. User interface 4, CPU 6, memory controller 8, GPU 12 and display interface 14 may communicate with each other using bus 18. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, a graphics application, a word processor application, an email application, a spread sheet application, a media player application, a video game application, a graphical user interface application, an operating system, or any other type of program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to render graphics data to a frame buffer for display on display 16. In some examples, the graphics rendering instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of memory 10. For example, memory controller 8 may receive memory read and write commands, and service such commands with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from both CPU 6 and memory 10, in other examples, some or all of the functionality of memory controller 8 may be implemented on one or both of CPU 6 and memory 10.

Memory 10 may store program modules and/or instructions that are accessible for execution by CPU 6 and/or data for use by the programs executing on CPU 6. For example, memory 10 may store program code and graphics data associated with the applications executing on CPU 6. Memory 10 may additionally store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of texture buffers, depth buffers, stencil buffers, vertex buffers, frame buffers, render targets, or the like. In addition, memory 10 may store command streams for processing by GPU 12. Memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium.

GPU 12 may be configured to execute commands that are issued to GPU 12 by CPU 6. The commands executed by GPU 12 may include graphics commands, draw call commands, GPU state programming commands, timestamp requests, memory transfer commands, general-purpose computing commands, kernel execution commands, etc.

In some examples, GPU 12 may be configured to perform graphics operations to render one or more graphics primitives to display 16. In such examples, when one of the software applications executing on CPU 6 requires graphics processing, CPU 6 may provide graphics data to GPU 12 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 16 more quickly than rendering the images using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may include a GPU cache, which may provide caching services for all or a portion of memory 10. In such examples, GPU 12 may use the cache to process data locally using a local storage, instead of off-chip memory. This allows GPU 12 to operate in a more efficient manner by reducing the need for GPU 12 to access memory 10 via bus 18, which may experience heavy bus traffic, during each read and write command. In some examples, however, GPU 12 may not include a separate cache, but instead utilize memory 10 via bus 18. The GPU cache may include one or more volatile or non-volatile memories or storage devices, such as, e.g., random access memory (RAM), static RAM (SRAM), dynamic RAM (DRAM), etc.

CPU 6 and/or GPU 12 may store rasterized image data in a frame buffer that is allocated within memory 10. Display interface 14 may retrieve the data from the frame buffer and configure display 16 to display the image represented by the rasterized image data. In some examples, display interface 14 may include a digital-to-analog converter (DAC) that is configured to convert the digital values retrieved from the frame buffer into an analog signal consumable by display 16. In other examples, display interface 14 may pass the digital values directly to display 16 for processing.

Display 16 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 16 may be integrated within computing device 2. For instance, display 16 may be a screen of a mobile telephone handset or a tablet computer. Alternatively, display 16 may be a stand-alone device coupled to computing device 2 via a wired or wireless communications link. For instance, display 16 may be a computer monitor or flat panel display connected to a personal computer via a cable or wireless link.

Bus 18 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 18 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, computing device 2 (e.g., CPU 6 and/or GPU 12) may be configured to perform any of the intra-frame timestamp value generation techniques described in this disclosure. For example, computing device 2 (e.g., CPU 6 and/or GPU 12) may be configured to generate a timestamp value that is indicative of a point in time based on a plurality of per-bin timestamp values that are generated by GPU 12 while performing tile-based rendering for a graphics frame. The timestamp value may be a function of at least two per-bin timestamp values of the plurality of per-bin timestamp values. Using per-bin timestamp values to generate application-requested timestamp values may allow intra-frame timestamp requests to be supported by a graphics processing system that performs tile-based rendering.

During operation, a graphics application executing on CPU 6 may generate an ordered sequence of commands (e.g., a command stream) to render a graphics frame. In some cases, the ordered sequence of commands may include a plurality of draw call commands and a plurality of timestamp requests. At least some of the timestamp requests may be placed in between different draw call commands in the ordered sequence of commands.

To execute the sequence of commands using tile-based rendering techniques, CPU 6 may, for each of the timestamp requests, generate a plurality of per-bin timestamp requests based on the respective timestamp request. CPU 6 may place each of the per-bin timestamp requests into a respective one of a plurality of command streams. Each of the command streams may be executed by GPU 12 during a respective one of a plurality of rendering pass iterations that occur while performing tile-based rendering. The command streams may be referred to as per-bin command streams. Each of the rendering pass iterations may be configured to render a respective one of a plurality of sub-regions of a render target.

CPU 6 may cause GPU 12 to execute the per-bin command streams. While executing the per-bin command streams, GPU 12 may generate per-bin timestamp values in response to executing the per-bin timestamp requests in the per-bin command streams received by GPU 12. In some cases, GPU 12 may generate a respective per-bin timestamp value for each of the per-bin timestamp requests included in the per-bin command streams. Each of the per-bin timestamp values may indicate a time at which a per-bin timestamp request associated with the respective per-bin timestamp value was executed by GPU 12. In some examples, each of the per-bin timestamp values may be included in a respective per-bin timestamp generated by GPU 12.

In some examples, GPU 12 may provide the per-bin timestamp values to CPU 6. In response to receiving the per-bin timestamp values, CPU 6 may generate one or more application-requested timestamp values based on the per-bin timestamp values. CPU 6 may use any of the techniques described in this disclosure to generate the application-requested timestamp values. CPU 6 may provide the graphics application with the application-requested timestamp values.

In further examples, GPU 12 may generate one or more application-requested timestamp values based on the per-bin timestamp values, and provide the application-requested timestamp values to CPU 6. GPU 12 may use any of the techniques described in this disclosure to generate the application-requested timestamp values. CPU 6 may provide the graphics application with the application-requested timestamp values.

In additional examples, GPU 12 may generate one or more intermediate values based on the per-bin timestamp values, and provide the intermediate values to CPU 6. CPU 6 may generate the per-bin timestamp values based on the intermediate values. CPU 6 and GPU 12 may use any of the techniques described in this disclosure to generate the application-requested timestamp values. CPU 6 may provide the graphics application with the application-requested timestamp values.

In some examples, CPU 6 and/or GPU 12 may generate application-requested timestamp values such that each application-requested timestamp values is a function of at least two different per-bin timestamp values. In such examples, the at least two different per-bin timestamp values may, in some examples, be generated during different rendering pass iterations. Using per-bin timestamp values that are generated during different rendering pass iterations may allow a graphics processing system to generate application-requested timestamp values that reflect, at least to some degree, the relative amounts of time taken by different draw call commands to execute during the rendering of a graphics frame. In this way, the techniques described in this disclosure may allow a tile-based rendering system to support intra-frame timestamps, even in cases where the tile-based rendering system executes draw call commands in a non-continuous, interleaved manner.

In some examples, computing device 2 (e.g., CPU 6 and/or GPU 12) may be configured to generate intra-frame timestamps in response to intra-frame timestamp requests that are received when performing tile-based rendering. In further examples, computing device 2 (e.g., CPU 6 and/or GPU 12) may be configured to receive a command stream that includes a plurality of draw call commands to be executed for a graphics frame to be rendered and one or more timestamp requests associated with the graphics frame to be rendered. In such examples, computing device 2 (e.g., CPU 6 and/or GPU 12) may be further configured to, in some examples, cause GPU 12 to execute the plurality of draw call commands for the graphics frame to be rendered using tile-based rendering techniques, and to generate one or more timestamps in response to the one or more timestamp requests. In some examples, the one or more timestamps may be generated based on a plurality of per-bin timestamp values.

The techniques described in this disclosure may, in some examples, be implemented in any of the components in computing device 2 illustrated in FIG. 1 including, e.g., CPU 6, GPU 12, and system memory 10. For example, the techniques for generating intra-frame timestamps may be performed by a graphics driver in CPU 6, a processing unit in GPU 12, or a combination thereof. As another example, a timestamp request may be issued by a software application (e.g., a graphics application or a user application) executing on CPU 6 to a GPU driver executing on CPU 6, and in response to the timestamp request, the GPU driver may return a timestamp generated according to the techniques of this disclosure. In some examples, the timestamp requests and the draw calls may be stored in memory 10 (e.g., as part of one or more command queues). In further examples, the timestamps returned in response to the timestamp requests may be stored in memory 10.

Figure 2:
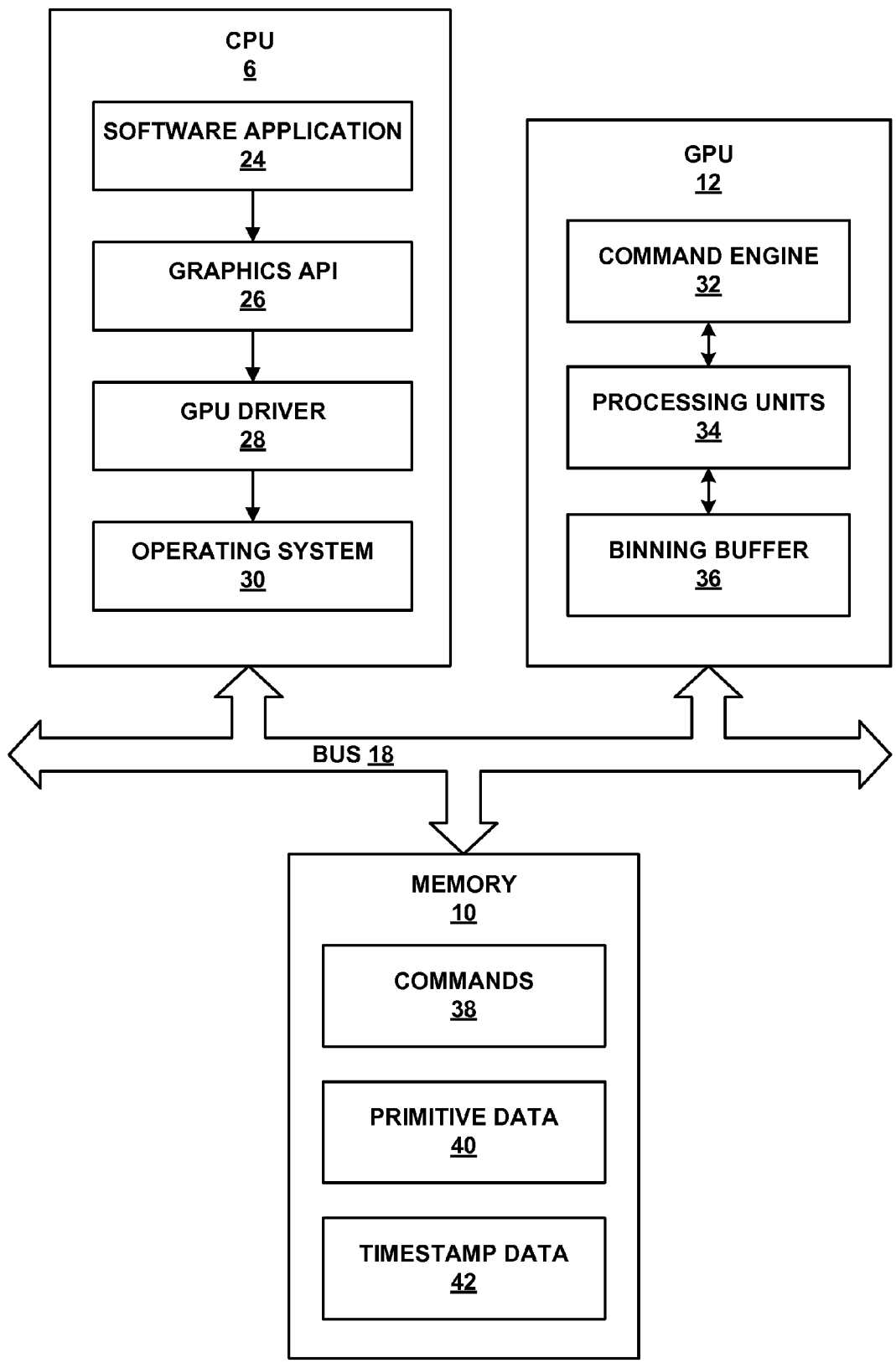
FIG. 2 is a block diagram illustrating the CPU, the GPU and the memory of the computing device shown in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 may include one or more processors (e.g., microprocessors) that are configured to execute any of a software application 24, a graphics API 26, a GPU driver 28 and an operating system 30. In some examples, CPU 6 may be configured to execute instructions that cause the one or more processors of CPU 6 to perform all or part of any of the techniques described in this disclosure.

GPU 12 includes a command engine 32, one or more processing units 34, and a binning buffer 36. The one or more processing units 34 may be configured to form a 3D graphics rendering pipeline. In some examples, one or more of processing units 34 may implement an on-chip, tessellation-enabled graphics rendering pipeline. Command engine 32 and processing units 34 may include any combination of dedicated hardware units, firmware, software, and processors that are configured to perform the functions attributed to such components. In some examples, GPU 12 may be configured to execute instructions that cause one or more processors of GPU 12 to perform all or part of any of the techniques described in this disclosure.

Memory 10 may store one or more commands 38, primitive data 40, and timestamp data 42. In some examples, memory 10 may also store instructions that, when executed, cause one or more processors to perform all or part of any of the techniques described in this disclosure.

Software application 24 may be a graphics application that uses GPU 12 to render one or more 3D graphics scenes and/or 3D graphics objects into an image to be displayed on a display. Software application 24 may include instructions that cause GPU 12 to rasterize and render a set of 3D graphics primitives. Software application 24 may issue the instructions to GPU driver 28 via graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

Operating system 30 may provide a software platform upon which software application 24, graphics API 26, and GPU driver 28 execute. Operating system 30 may manage the hardware details of communicating and transferring data between CPU 6, memory 10 and GPU 12.

Commands 38 may include one or more state commands, one or more draw call commands and/or one or more timestamp requests (e.g., one or more per-bin timestamp requests). A state command may instruct GPU 12 to change one or more of the state variables in GPU 12, such as, e.g., the primitive type. A draw call command may instruct GPU 12 to render the geometry defined by a group of one or more vertices (e.g., defined in a vertex buffer) stored in memory 10. The geometry defined by the group of one or more vertices may, in some examples, correspond to a plurality of primitives to be rendered (e.g., primitive data 40). In general, a draw call command may invoke GPU 12 to render all of the vertices stored in a defined section (e.g., buffer) of memory 10. In other words, once the GPU 12 receives the draw call command, control is passed to GPU 12 for rendering the geometry and primitives represented by the vertices in the defined section (e.g., buffer) of memory 10.

A timestamp request may instruct GPU 12 and/or GPU driver 28 to generate a timestamp in response to processing the timestamp request. GPU 12 and/or GPU driver 28 may return a timestamp in response to receiving a timestamp request. The timestamp may include a time value. For per-bin timestamp requests, the time value may be indicative of a time at which GPU 12 processed the timestamp request. For application-requested timestamp requests, the time value may be indicative of relative amounts of time taken to perform draw calls in a command stream by GPU 12.

In some examples, commands 38 may be stored in the form of a command stream (e.g., a command queue, a command buffer, etc.). The command stream may specify an ordered sequence of graphics commands. In some examples, the ordered sequence of commands may include a plurality of draw call commands and a plurality of timestamp requests. In some examples, at least one of the timestamp requests may be positioned between at least two of the draw call commands in the ordered sequence of graphics commands. In further examples, at least one of the draw call commands may be positioned between at least two of the timestamp requests in the ordered sequence of graphics commands.

Command engine 32 is configured to retrieve and execute commands 38 stored in memory 10. Command engine 32 may manage the rendering state of GPU 12, control the operation of processing units 34 such that processing units 34 implement a graphics rendering pipeline, cause graphics data to be rendered into a render target via the graphics rendering pipeline, and return timestamps in response to encountering a timestamp request (e.g., a per-bin timestamp request) in a command stream.

In response to receiving a state command, command engine 32 may be configured to set one or more state registers in GPU to particular values based on the state command, and/or to configure one or more of the fixed-function processing units 34 based on the state command. In response to receiving a draw call command, command engine 32 may be configured to cause processing units 34 to render the geometry represented by vertices in memory 10 (e.g., the geometry represented by primitive data 40). Command engine 32 may also receive shader program binding commands, and load particular shader programs into one or more of the programmable processing units 34 based on the shader program binding commands. In response to receiving a timestamp request (e.g., a per-bin timestamp request), command engine 32 may generate timestamp and provide the timestamp to CPU 6 (e.g., GPU driver 28).

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc.

A programmable shader unit may, in some examples, include a plurality of processing units that are configured to operate in parallel, e.g., a single instruction multiple data (SIMD) pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed-function hardware may be configurable, via one or more control signals, for example, to perform different functions, the fixed-function hardware typically does not include a program memory that is capable of receiving user-compiled programs. In some examples, the fixed-function processing units in processing units 34 may include, for example, processing units that perform raster operations, such as, e.g., depth testing, scissors testing, alpha blending, etc.

Binning buffer 36 may be configured to store rasterized data for a sub-region of a render target. Binning buffer 36 may act as a temporary render target for particular sub-regions of the actual render target during the performance of the rendering pass. Binning buffer 36 may include one or more volatile or non-volatile memories or storage devices, such as, e.g., random access memory (RAM), static RAM (SRAM), dynamic RAM (DRAM), etc. In some examples, binning buffer 36 may be an on-chip buffer. An on-chip buffer may refer to a buffer that is formed on, located on, and/or disposed on a microchip, an integrated circuit, and/or a die that is the same as the microchip, integrated circuit, and/or die upon which GPU is formed, located, and/or disposed.

In some examples, processing units 34 may access binning buffer 36 via a first communication interface, and access the render target (e.g., a frame buffer stored in memory 10) via a second communication interface that is different than the first communication interface. In such examples, the first communication interface may have, in some examples, a higher bandwidth than the second communication interface. The second communication interface may, in some examples, correspond to bus 18 in FIG. 1 and the connection between memory controller 8 and memory 10 in FIG. 1. When binning buffer 36 is an on-chip bin buffer, the first communication interface may be a communication interface that is internal to GPU 12.

As used herein, bandwidth may refer to the rate at which a communication interface is capable of transferring data between two components, e.g., a memory component and GPU 12. The units for bandwidth may, in some examples, be given as a number of bits per unit of time, e.g., gigabits per second (Gb/s). When a bus having a bus width of multiple bits is used as part of the communication interface, the bandwidth may, in some examples, be equal to the product of the width of the bus multiplied by the rate at which data is transferred along a single bit line. For example, if a bus is 16 bits wide, and each bit line of the bus is capable of transferring data at a rate of 2 Gb/s, the bandwidth of the bus may be equal to 32 Gb/s. If multiple buses form a communication interface between two components, then the bandwidth of the communication interface may be a function of the bandwidth of each of multiple buses, e.g., the minimum bandwidth of each of the individual buses.

When binning buffer 36 is implemented on the same chip as GPU 12, GPU 12 does not necessarily need to access binning buffer 36 via the system and memory buses (e.g., bus 18 in FIG. 1 and the connection between memory controller 8 and memory 10 in FIG. 1), but rather may access binning buffer 36 via an internal communication interface (e.g., a bus) implemented on the same chip as the GPU 12. Because such an interface is on-chip, it may be capable of operating at a higher bandwidth than the system and memory busses. Although the above described technique is one way of achieving a communication interface for binning buffer 36 that exceeds the bandwidth of the communication interface used to access memory 10, other techniques are possible and within the scope of this disclosure.

The capacity of binning buffer 36 may, in some examples, be limited by the area available on certain types of computing devices, e.g., mobile devices. Moreover, when binning buffer 36 is implemented on the same chip as GPU 12, the amount of area available to implement binning buffer 36 on the same chip may be limited due to the other functionality that is implemented on the chip. In some examples, binning buffer 36 may have a bit density that is lower than the bit density of the render target further limiting the capacity of binning buffer 36. Because of these and/or other factors, the capacity of binning buffer 36 may, in some cases, be less than the size of the render target. Consequently, the capacity of binning buffer 36 may, in such examples, be less than a minimum capacity needed to store pixel data for all of a plurality of destination pixels associated with a graphics image (e.g., a single frame). The capacity of a memory component may refer a maximum amount of data (e.g., a maximum number of bits) capable of being stored in the memory component. The size of the render target may refer to the amount of data (e.g., the number of bits) stored in the memory range allocated to the render target. Bit density may refer to the number of bits that can be stored in a particular amount of area.

As discussed above, when performing tile-based rendering, GPU 12 may render each sub-region of a render target during a separate iteration of a rendering pass. For example, as part of a single rendering pass iteration for a particular sub-region of a render target (e.g., a particular subset of the destination pixels of the graphics image), GPU 12 may render all or a subset of the primitives with respect to the particular sub-region of the render target. The capacity of binning buffer 36 may be configured to be greater than or equal to the size of the sub-region of the render target. Therefore, during a single rendering pass iteration, all destination pixel data associated with a respective one of the sub-regions of the render target may be available in binning buffer 36 without necessarily needing to access a frame buffer in memory 10. Consequently, during a single rendering pass iteration, GPU 12 may be able to read the destination pixel data from binning buffer 36 via a relatively high bandwidth communication interface rather than having to read such data from memory 10 via a relatively low bandwidth communication interface.

Although some graphics systems that do not perform tile-based rendering may be capable of caching part of the frame buffer by using a hardware-based, on-chip cache, such caches do not guarantee that the destination pixel values for a given pixel will be available when needed. This is because multiple destination pixels may map to the same address in the hardware-based cache. If tile-based rendering is not used, then the current state of the hardware-based cache may not necessarily include the destination pixel values associated with a currently processed sub-region of a render target, but rather include destination pixel values associated with previously processed primitives in other sub-regions of the render target.

In contrast to a hardware-based cache, where multiple destination pixels map to the same cache location, the destination pixels stored in binning buffer 36 for a given rendering pass iteration may, in some examples, be uniquely addressable. In other words, for a given rendering pass iteration, a one-to-one mapping may be defined between the addressable storage slots in binning buffer 36 and the destination pixels used for that rendering pass iteration. Consequently, when performing tile-based rendering, all destination pixel values for a given binning pass may, in some examples, be available from binning buffer 36 via a relatively low bandwidth communication interface. Moreover, unlike the hardware-based cache systems, because of the uniquely addressable data in binning buffer 36, cache misses do not occur, thereby alleviating the need to resort to bandwidth-expensive frame buffer accesses in the event of a cache miss.

A destination pixel may refer to pixel data stored in a render target (e.g., either a frame buffer or a corresponding binning buffer) for a particular pixel location. In contrast, a source pixel may refer to pixel data that has been generated by a rasterization processing unit in processing units 34 and has not yet been stored to and/or merged with a render target. A destination pixel may include composited pixel data from multiple source pixels associated with different primitives.

To perform the tile-based rendering, software application 24 may, in some examples, place primitive data 40 into memory 10 that geometrically defines a set of one or more 3D graphics primitives to be rendered, and issue one or more draw call commands to GPU driver 28 via graphics API 26. The draw call commands may cause the primitives defined by primitive data 40 to be rasterized and rendered by GPU 12 into a render target (e.g., a frame buffer stored in memory 10).

In some examples, software application 24 may configure GPU 12 to render a particular type of primitive. For example, software application 24 may issue a state command to GPU 12 that specifies the particular type of primitive to render during a draw call. In additional examples, prior to issuing the draw call commands, software application 24 may configure GPU 12 to use one or more tessellation techniques to render a primitive. For example, software application 24 may cause one or more shader programs that implement the tessellation techniques to execute on one or more shader units of GPU 12 (e.g., a hull shader unit and/or a domain shader unit) during the draw call instruction.

Primitive data 40 may include data indicative of one or more primitives to be rendered. In some cases, primitive data 40 may geometrically define the primitives to be rendered. Geometrically defining a primitive may refer to defining a primitive by a set of vertices (or control points) and corresponding vertex attributes. In some examples, primitive data 40 may take the form of a plurality of vertices, a vertex list, and/or vertex buffer. In further examples, primitive data 40 may take the form a vertex buffer in combination with an index buffer. In such examples, the vertex buffer may define the vertices, and the index buffer may specify which vertices are used to define each of the primitives.

Each of vertices included in primitive data 40 may include one or more attributes, such as, e.g., positional coordinates, normal coordinates, texture coordinates, etc. The vertices may conceptually correspond to the vertices of a geometric primitive (e.g., a point, line, triangle, etc.) and/or to the control points of a higher-order primitive (e.g., a higher-order surface, such as a Bezier surface). In some case, each of the vertices may be grouped into groups of one or more vertices, and each of these groups of vertices may correspond to a single primitive.

The shape of the geometrically-defined primitive may be defined, in some examples, by additional data that is not necessarily included in primitive data 40. The additional data may include one or more of a specified primitive type from a set of one or more predetermined primitive types, one or more mathematical functions, and/or one or more tessellation techniques.

In some examples, the specified primitive type may be stored as a rendering state variable in GPU 12 and may be configurable by software application 24. The specified primitive type may, in some cases, define the shape of the resulting rendered primitives (e.g., points, lines, triangles, etc.) and/or the connectivity of the vertices included in primitive data 40 (e.g., triangle strip, triangle fan, etc.). In some examples, the different primitive types may correspond to a set of primitive topologies that the graphics pipeline implemented by processing units 34 is capable of processing. In further examples, the different primitive types may correspond to the set of primitive topologies that are defined by graphics API 26 and are available for use by software application 24.

The one or more mathematical functions, and/or the one or more tessellation techniques, may be specified in one or more shader programs that are configured to execute on one or more shader units of GPU 12 (e.g., a hull shader unit and/or domain shader unit). The mathematical functions may be used to define primitives that have curved lines and/or curve surfaces. The one or more tessellation techniques may be used to define a primitive by a plurality of tessellated primitives that approximate the shape and/or curvature of an input primitive.

In response to receiving a draw call command from software application 24, GPU driver 28 may cause GPU 12 to perform tile-based rendering based on the plurality of primitives to be rendered (e.g., primitive data 40). For example, GPU driver 28 may cause GPU 12 to perform a binning pass and rendering pass that includes a plurality of rendering pass iterations. During the binning pass, GPU 12 may determine to which of a plurality of sub-regions of a render target each of the primitives contributes image data (e.g., pixel data), and generate binning data that indicates to which of the plurality of sub-regions of a render target each of the primitives contributes image data (e.g., pixel data). Once the binning data has been generated, GPU 12 may perform a rendering pass that includes the plurality of rendering pass iterations based on the binning data and the primitive data 40 to generate a composite, rasterized version of the primitives.

In some examples, in order to perform the binning pass, the rasterizer in GPU 12 may be configured to perform low-resolution z-buffering and/or back-face culling on the primitives to be rasterized. In such examples, the binning data may be generated based on primitives that are visible after z-buffering and/or back-face culling.

In some cases, the rendered primitives may be stored as a plurality of pixels. Each of the pixels may be associated with one or more spatial locations of the render target, and may include one or more attributes indicative of the color of the respective pixel. In some cases, each of the pixels may further include one or more attributes indicative of the transparency of the pixel. In some examples, the pixel data may include Red, Green, Blue, and Alpha (RGBA) attributes for each pixel where the "RGB" components correspond to color values and the "A" component corresponds to an alpha value (i.e., a transparency or blending value).

The techniques described in this disclosure may be implemented in any of the components shown in FIG. 2 including, e.g., software application 24, graphics API 26, GPU driver 28, command engine 32 and processing units 34. For example, GPU driver 28, command engine 32, and/or processing units 34 may be configured to generate one or more timestamps (e.g., intra-frame timestamps) according to any of the techniques described in this disclosure.

In some examples, GPU driver 28, command engine 32, and/or processing units 34 may be configured to generate a timestamp value that is indicative of a point in time based on a plurality of per-bin timestamp values that are generated by GPU 12 while performing tile-based rendering for a graphics frame. The timestamp value may be a function of at least two per-bin timestamp values of the plurality of per-bin timestamp values. Using per-bin timestamp values to generate application-requested timestamp values may allow intra-frame timestamp requests to be supported by a graphics processing system that performs tile-based rendering.

During operation, software application 24 (e.g., a graphics application) executing on CPU 6 may generate an ordered sequence of commands (e.g., a command stream) to render a graphics frame. In some cases, the ordered sequence of commands may include a plurality of draw call commands and a plurality of timestamp requests. At least some of the timestamp requests may be placed in between different draw call commands in the ordered sequence of commands. Software application 24 may provide the ordered sequence of commands to GPU driver 28 via graphics API 26.

To execute the sequence of commands using tile-based rendering techniques, GPU driver 28 may, for each of the timestamp requests, generate a plurality of per-bin timestamp requests based on the respective timestamp request. GPU driver 28 may place each of the per-bin timestamp requests into a respective one of a plurality of command streams (e.g., commands 38 in memory 10). Each of the command streams may be executed by GPU 12 during a respective one of a plurality of rendering pass iterations that occur while performing tile-based rendering. The command streams may be referred to as per-bin command streams. Each of the rendering pass iterations may be configured to render a respective one of a plurality of sub-regions of a render target.

GPU driver 28 may cause GPU 12 to execute the per-bin command streams. While executing the per-bin command streams, GPU 12 (e.g., command engine 32 and/or processing units 34) may generate per-bin timestamp values in response to executing the per-bin timestamp requests in the per-bin command streams received by GPU 12. In some cases, GPU 12 may generate a respective per-bin timestamp value for each of the per-bin timestamp requests in the per-bin command streams. Each of the per-bin timestamp values may indicate a time at which a per-bin timestamp request associated with the respective per-bin timestamp value was executed by GPU 12. In some examples, each of the per-bin timestamp values may be included in a respective per-bin timestamp generated by GPU 12.

In some examples, GPU 12 may provide the per-bin timestamp values to GPU driver 28. For example, GPU 12 may place the per-bin timestamp values into timestamp data 42 of memory 10, which may be accessed by GPU driver 28. In response to receiving the per-bin timestamp values, GPU driver 28 may generate one or more application-requested timestamp values based on the per-bin timestamp values. GPU driver 28 may use any of the techniques described in this disclosure to generate the application-requested timestamp values. GPU driver 28 may provide software application 24 with the application-requested timestamp values.

In further examples, GPU 12 may generate one or more application-requested timestamp values based on the per-bin timestamp values, and provide the application-requested timestamp values to GPU driver 28. GPU 12 may use any of the techniques described in this disclosure to generate the application-requested timestamp values. In some examples, GPU 12 may place the application-requested timestamp values into timestamp data 42 of memory 10, which may be accessed by GPU driver 28. GPU driver 28 may provide software application 24 with the application-requested timestamp values.

In additional examples, GPU 12 may generate one or more intermediate values based on the per-bin timestamp values, and provide the intermediate values to GPU driver 28. GPU driver 28 may generate the per-bin timestamp values based on the intermediate values. GPU driver 28 and GPU 12 may use any of the techniques described in this disclosure to generate the application-requested timestamp values. GPU driver 28 may provide software application 24 with the application-requested timestamp values.

In some examples, CPU 6 and/or GPU 12 may generate application-requested timestamp values such that each application-requested timestamp value is a function of at least two different per-bin timestamp values. In such examples, the at least two different per-bin timestamp values may, in some examples, be generated during different rendering pass iterations. Using per-bin timestamp values that are generated during different rendering pass iterations may allow a graphics processing system to generate application-requested timestamp values that reflect, at least to some degree, the relative amounts of time taken by different draw call commands to execute during the rendering of a graphics frame. In this way, the techniques described in this disclosure may allow a tile-based rendering system to support intra-frame timestamps, even in cases where the tile-based rendering system executes draw call commands in a non-continuous, interleaved manner.

Tile-based rendering may, in some examples, involve subdividing a render target into a plurality of sub-regions (e.g., bins or tiles), and performing a rendering pass that includes a separate rendering pass iteration for each of the sub-regions of the render target. To reduce the number of primitives that need to be processed during the rendering pass, a binning pass may, in some examples, be performed prior to the rendering pass. The binning pass may be used to generate binning data that indicates to which of a plurality of sub-regions of a render target each of the primitives to be rendered contributes pixel data. The binning data may be used during the rendering pass iterations to selectively render primitives that contribute to sub-regions of the render target that are active during particular rendering pass iterations, thereby reducing the number of primitives that need to be processed during the rendering pass.

Rendering may refer to the process of converting 3D graphics primitives that correspond to 3D objects in a graphics scene into 2D rasterized image data. Rendering typically takes place with respect to a render target (e.g., a frame buffer), which is usually updated as each of the graphics primitives in the scene is rendered. Therefore, not only does the render target store the final 2D rasterized image data for a graphics scene, but the render target may also store intermediate data as the graphics scene is rendered. The 2D rasterized image data stored in the render target may include a plurality of pixels where each of the pixels includes color data, transparency data, and/or depth data. As each new primitive is rendered into the render target, the 2D rasterized image data of the new primitive is merged with the existing intermediate data that is already stored in the render target for the previously rendered primitives.

To merge the data in the render target, the intermediate data typically needs to be read from the render target prior to writing the new data to the render target. Therefore, rendering may involve the performance of numerous read and write operations with respect to a memory that contains the render target, thereby resulting in high memory bandwidth usage. Because of the high memory bandwidth usage, it is desirable to use a dedicated, high-bandwidth, on-chip memory for the render target. However, in area-limited applications, such as, e.g., mobile applications, there may not be enough available area to implement a high-bandwidth, on-chip memory that is able to simultaneously hold all of the data for each of the pixels in the render target.

Tile-based rendering may address the above-mentioned issues by subdividing a render target into a plurality of sub-regions (e.g., tiles or bins), and performing a rendering pass that includes a separate rendering pass iteration for each of the sub-regions of the render target. Each of the sub-regions may correspond to a subset of the pixels in the render target (e.g., a 16×16 tile of pixels). The sub-regions of a render target may be alternatively referred to as tiles or bins. During each of the rendering pass iterations, all of the image data associated with the corresponding sub-region may be rendered, which may include rendering each of the primitives that contributes pixel data to the sub-region. A high-bandwidth, on-chip memory that is large enough to store the data for a single sub-region of the render target may be used as a local render target for each of the rendering pass iterations, and after a rendering pass iteration has completed, the contents of the local render target for the rendering pass iteration may be transferred to the general render target stored in a low-bandwidth, off-chip system memory. By performing separate rendering pass iterations on a per-tile basis, tile-based rendering schemes may be able to allow a high-bandwidth, on-chip memory to be used for merging rasterized image data even in area-limited applications that do not allow for large on-chip memories.

One approach for performing tile-based rendering is to perform a rendering pass iteration for each of the sub-regions of the render target, and during each of the rendering pass iterations, render all of the primitives in the scene while using different scissors settings to limit the output to a particular sub-region that is currently being rendered. Such an approach, however, may be inefficient because each of the primitives is rendered in each of the rendering pass iterations regardless of whether or not the primitive is actually visible in the rendered sub-region.

In order to improve the efficiency of tile-based rendering, a binning pass may, in some examples, be performed prior to the performance of the rendering pass. The binning pass may be used to determine binning data for the primitives. For each of the primitives to be rendered, the binning data may indicate with respect to which of the sub-regions of the render target each of the primitives contribute pixel data.

Figure 3:
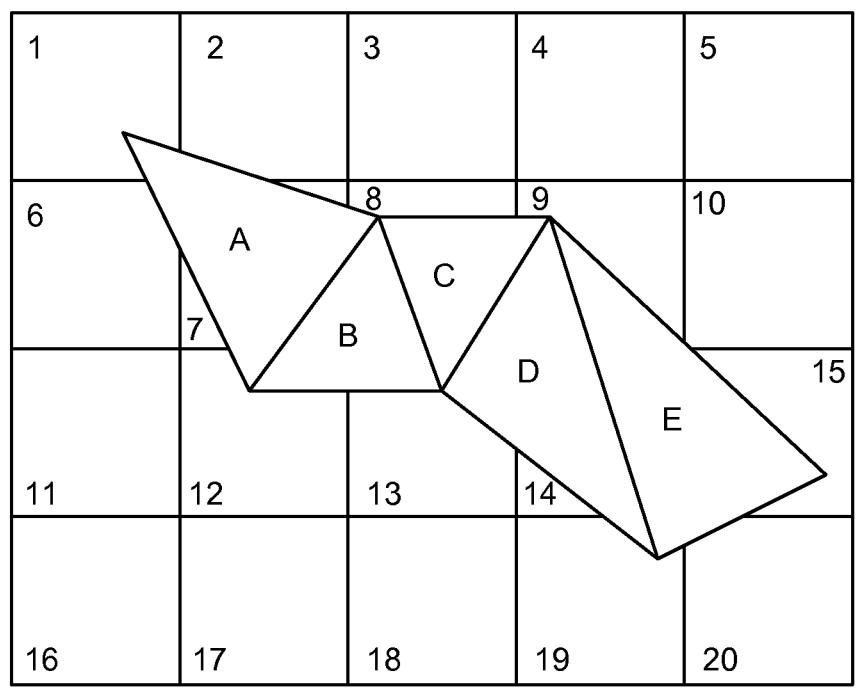
FIG. 3 is a conceptual diagram illustrating an example render target that is subdivided into a plurality of sub-regions (e.g., tiles) and an example set of primitives displayed on the subdivided render target.

FIG. 3 is a conceptual diagram illustrating an example render target 50 that is subdivided into a plurality of sub-regions. FIG. 3 also illustrates a plurality of primitives displayed on the subdivided render target 50. In some cases, render target 50 may correspond to a frame buffer. As shown in FIG. 3, render target 50 is divided into a plurality of non-overlapping sub-regions (alternatively referred to as bins or tiles), which are numbered 1-20. Each of the sub-regions may correspond to a subset of the pixels in render target 50 (e.g., a 16×16 tile of pixels, etc.). For the example primitive shown in FIG. 3, the binning data may indicate that Primitive A contributes pixel data to Tiles 1, 2, 6, 7, 8 and 12, that primitive B contributes pixel data to Tiles 7, 8, 12 and 13, etc.

In some examples, the binning data may be generated based on a composite of the rasterized versions of each of the primitives to be rendered to the render target. In some cases, conservative z-testing and/or other culling techniques may be used to generate the rasterized versions of each of the primitives. Conservative z-testing and/or other culling techniques may remove occluded primitives (i.e., primitives that are located behind other primitives) from being included in the list of primitives that are said to contribute to a particular tile.

During a rendering pass iteration for a particular sub-region (e.g., the or bin), the binning data may be used to select primitives to be rendered that actually contribute image data (e.g., pixel data) to the sub-region, and to bypass rendering primitives that do not contribute image data to the sub-region. In this way, the number of primitives that need to be processed during a given rendering pass iteration may, in some cases, be reduced.

In some examples, GPU 12 may perform a rendering pass iteration for each of the sub-regions of the render target based on the binning data generated from the binning pass. For example, for each of a plurality of rendering pass iterations, GPU 12 may determine whether to render a plurality of primitives associated with one or more draw calls during the respective rendering pass iteration based on the binning data. If the binning data indicates that a primitive contributes pixel data to a sub-region associated with a respective rendering pass iteration, then GPU 12 may render the primitive during the rendering pass iteration into the sub-region associated with the respective rendering pass iteration. On the other hand, if the binning indicates that a primitive does not contribute pixel data to the sub-region associated with the respective rendering pass iteration, then GPU 12 may not render the primitive into the sub-region associated with the respective rendering pass iteration.

Although the sub-regions shown in FIG. 3 are substantially the same size and shape, in other examples, the sub-regions may have different sizes and/or different shapes. In addition, the size and shape of the sub-regions need not be substantially fixed at the time of manufacture of the GPU or at the time of rendering, but in some examples, may be dynamically adjusted during operation of GPU 12.

FIG. 4 is a conceptual diagram illustrating an example command stream 52 issued by a graphics application according to this disclosure. In some examples, command stream 52 may be issued by software application 24 shown in FIG. 2. In further examples, command stream 52 may be received and/or processed by GPU driver 28 shown in FIG. 2.

Command stream 52 includes an ordered sequence of commands (i.e., TSR1, DRAW1, TSR2, DRAW2, TSR3, DRAW3, TSR4). In FIG. 4, TSR stands for "timestamp request" and DRAW stands for "draw call command." As such, the sequence of commands illustrated in FIG. 4 includes a first timestamp request (TSR1), followed by a first draw call command (DRAW1), followed by a second timestamp request (TSR2), followed by a second draw call command (DRAW2), followed by a third timestamp request (TSR3), followed by a third draw call command (DRAW3), followed by a fourth timestamp request (TSR4), followed by a fourth draw call command (DRAW4).

Each of the commands in command stream 52 may be associated with the rendering of a single graphics frame. Each of the draw call commands may specify one or more primitives to be rendered as part of the same graphics frame. In some examples, different draw call commands may be associated with different primitive types that are used to render primitives in the graphics frame and/or with different rendering states that are used to render primitives in the graphics frame.

As shown in FIG. 4, a timestamp request is placed between each of the draw call commands. As further shown in FIG. 4, a draw call command is placed between each of the timestamp requests. TSR2 and TSR3 may both correspond to intra-frame timestamp requests because such timestamp requests are each positioned between two different draw call commands.

FIG. 5 is a conceptual diagram illustrating an example execution timeline 54 for performing a rendering pass according to this disclosure. Execution timeline 54 increases in time from left to right.

The example execution timeline 54 depicts a sequence of rendering pass iterations that is performed as part of a rendering pass in the case where a render target is subdivided into four bins or sub-regions (i.e., A, B, C and D). Each of the rendering pass iterations is performed with respect to a particular bin of the render target. For example, "Rendering Pass Iteration A" is performed with respect to a first bin (i.e., bin "A") of the render target, "Rendering Pass Iteration B" is performed with respect to a second bin (i.e., bin "B") of the render target, etc.

In some examples, computing system 2 shown in FIG. 1 may perform the rendering pass iterations depicted in execution timeline 54. In further examples, GPU 12 may perform the rendering pass iterations depicted in execution timeline 54, and CPU 6 may cause GPU 12 to perform the rendering pass iterations depicted in execution timeline 54.

As shown in FIG. 5, computing system 2 (e.g., CPU 6 and/or GPU 12) may perform a rendering pass iteration for each of the bins included in a render target. For example, computing system 2 (e.g., CPU 6 and/or GPU 12) may perform a first rendering pass iteration with respect to a first bin (Rendering Pass Iteration A), followed by a second rendering pass iteration with respect to a second bin (Rendering Pass Iteration B), followed by a third rendering pass iteration with respect to a third bin (Rendering Pass Iteration C), followed by a fourth rendering pass iteration with respect to a fourth bin (Rendering Pass Iteration D).

FIG. 6 is a conceptual diagram illustrating example command streams 56, 58, 60, 62 for performing a plurality of rendering pass iterations according to this disclosure. In some examples, command streams 56, 58, 60, 62 may be issued and/or generated by GPU driver 28 shown in FIG. 2. In further examples, command streams 56, 58, 60, 62 may be received and/or processed by GPU 12 and/or command engine 32 shown in FIG. 2.

In FIG. 6, TSR stands for "timestamp request," and DRAW stands for "per-bin draw call." The TSRGPU timestamp requests correspond to timestamp requests that are generated by GPU driver 28 and placed into respective command streams 56, 58, 60, 62 at the start of respective rendering pass iterations. In some examples, the TSRs and the TSRGPUs in FIG. 6 may be alternatively referred to as per-bin timestamp requests to distinguish such timestamp requests from the timestamp requests included in command stream 52 of FIG. 4. The timestamps and timestamp values that are generated in response to per-bin timestamp requests may be referred to, respectively, as per-bin timestamps and per-bin timestamp values.

Similarly, the timestamp requests included in command stream 52 of FIG. 4 may be referred to as application-generated timestamp requests to distinguish such timestamp requests from the per-bin timestamp requests that are generated by GPU driver 28. Timestamps and timestamp values that are generated in response to application-generated timestamp requests may be referred to, respectively, as application-requested timestamps and application-requested timestamp values.

In some examples, the per-bin timestamp requests may be generated by GPU driver 28 in response to receiving application-generated timestamp requests from software application 24 in command stream 52. For example, GPU driver 28 may generate per-bin timestamp requests TSR1A, TSR1B, TSR1C and TSR1D in response to encountering application-generated timestamp request TSR1 in command stream 52. As another example, GPU driver 28 may generate per-bin timestamp requests TSR3A, TSR3B, TSR3C and TSR3D in response to encountering application-generated timestamp request TSR3 in command stream 52.

In some examples, the TSRGPU timestamp requests may not be generated based on or in response to encountering application-generated timestamp requests in command stream 52. Instead, in such examples, GPU driver 28 may automatically generate the TSRGPU timestamp requests for each rendering pass instance to be performed during a rendering pass.

The number after each of the per-bin timestamp requests indicates the application-generated timestamp request that is associated with the per-bin timestamp request. A per-bin timestamp request may be associated with an application-generated timestamp-request if the per-bin timestamp request in generated by GPU driver 28 based on or in response to encountering the application-generated timestamp request in an application-generated command stream (e.g., command stream 52). For example, per-bin timestamp requests TSR1A, TSR1B, TSR1C and TSR1D are associated with application-generated timestamp request TSR1 in command stream 52.

The letter after each of the per-bin timestamp requests indicates the rendering pass iteration in execution timeline 54 that is associated with the respective per-bin timestamp request. A timestamp request may be associated with a rendering pass iteration if the timestamp request is issued and/or serviced during the rendering pass iteration. For example, TSR1A indicates a per-bin timestamp request that is associated with application-generated timestamp request TSR1 and the first rendering pass iteration (i.e., Rendering Pass Iteration A) in execution timeline 54.

The number after each of the per-bin draw calls indicates the draw call command in command stream 52 that is associated with the respective per-bin draw call. The letter after each of the per-bin draw calls indicates the rendering pass iteration in execution timeline 54 that is associated with the respective per-bin draw call.

For example, "DRAW1A" indicates a per-bin draw call that is associated with the first draw call command (i.e., DRAW1) in command stream 52 and the first rendering pass iteration (i.e., Rendering Pass Iteration A) in execution timeline 54. As another example, "DRAW2C" indicates a per-bin draw call that is associated with the second draw call command (i.e., DRAW2) in command stream 52 and the third rendering pass iteration (i.e., Rendering Pass Iteration C) in execution timeline 54.

A per-bin draw call may be associated with a draw call command if the per-bin draw call is generated based on the draw call command in order to execute the draw call command. A per-bin draw call may be associated with a rendering pass iteration if the per-bin draw call is executed during the rendering pass iteration.

Similar to FIG. 4, each of the command streams 56, 58, 60, 62 in FIG. 6 includes an ordered sequence of commands.

For example, command stream 56 includes a first per-bin timestamp request (TSRGPUA), followed by a second per-bin timestamp request (TSR1A), followed by a first per-bin draw call (DRAW1A), followed by a third per-bin timestamp request (TSR2A), followed by a second per-bin draw call (DRAW2A), followed by a fourth per-bin timestamp request (TSR3A), followed by a third per-bin draw call (DRAW3A), followed by a fifth per-bin timestamp request (TSR4A).

Each of the command streams 56, 58, 60, 62 is executed during a respective one of the rendering pass iterations. For example, command stream 56 is executed during "Rendering Pass Iteration A," command stream 58 is executed during "Rendering Pass Iteration B," command stream 60 is executed during "Rendering Pass Iteration C," and command stream 62 is executed during "Rendering Pass Iteration D."

Each of the rendering pass iterations is configured to render a respective one of a plurality of bins (e.g., sub-regions of a render target). For example, as shown in FIG. 6, "Rendering Pass Iteration A" is configured to render "Bin A" of the render target, "Rendering Pass Iteration B" is configured to render "Bin B" of the render target, "Rendering Pass Iteration C" is configured to render "Bin C" of the render target, and "Rendering Pass Iteration D" is configured to render "Bin D" of the render target In response to receiving command stream 52 shown in FIG. 4, GPU driver 28 may generate a plurality of per-bin draw calls for each of the draw call commands included in command stream 52 and a plurality of per-bin timestamp requests for each of the timestamp requests included in command stream 52. For example, in response to encountering DRAW1 in command stream 52, GPU driver 28 may generate DRAW1A, DRAW1B, DRAW1C, and DRAW1D. As another example, in response to encountering TSR2 in command stream 52, GPU driver 28 may generate TSR2A, TSR2B, TSR2C, and TSR2D.

GPU driver 28 may also generate a plurality rendering pass iteration-specific command streams 56, 58, 60, 62 based on the per-bin draw calls and the per-bin timestamp requests generated by GPU driver 28. For example, GPU driver 28 may group the per-bin draw calls and the per-bin timestamp requests together by bin, and place each group of per-bin draw calls and per-bin timestamp requests into a separate one of command streams 56, 58, 60, 62.

In some examples, GPU driver 28 may also place timestamp requests at the beginning of each of command streams 56, 58, 60, 62 that are not associated with an application-generated timestamp request in command stream 52 of FIG. 4. These timestamp requests may, in some examples, serve as reference timestamp requests when generating the timestamp values for the application-generated timestamp requests.

GPU driver 28 may cause GPU 12 to perform a plurality of rendering pass iterations based on command streams 56, 58, 60, 62. For example, GPU driver 28 may cause GPU 12 to execute each of command streams 56, 58, 60, 62 during a separate rendering pass iteration.

In some examples, while executing command streams 56, 58, 60, 62, GPU 12 may issue a per-bin timestamp to CPU 6 (e.g., GPU driver 28) in response to encountering each of the per-bin timestamp requests in command streams 56, 58, 60, 62. The per-bin timestamp issued by GPU 12 may include a timestamp value that corresponds to the time at which GPU 12 encountered the per-bin timestamp request when executing one of command streams 56, 58, 60, 62. In such examples, in response to receiving the per-bin timestamps and/or per-bin timestamp values from GPU 12, GPU driver 28 may generate one or more application-requested timestamps based on the per-bin timestamps and/or the per-bin timestamp values received from GPU 12, and provide the application-requested timestamps to software application 24.

In further examples, while executing command streams 56, 58, 60, 62, GPU 12 may internally keep track of per-bin timestamp values that correspond to the per-bin timestamp requests. In such examples, GPU 12 may, in some examples, generate one or more application-requested timestamps and/or one or more application-requested timestamp values based on the per-bin timestamp values that internally tracked by GPU 12, and provide the application-requested timestamps and/or timestamp values to GPU driver 28. In response to receiving the application-requested timestamps and/or timestamp values, GPU driver 28 may generate and/or provide an application-generated timestamp to software application 24.

In additional examples where GPU 12 internally tracks per-bin timestamp values, GPU 12 may, in some examples, generate one or more intermediate time values, and provide the one or more intermediate time values to GPU driver 28. In response to receiving the intermediate time values, GPU driver 28 may generate an application-generated timestamp, and provide the application-generated timestamp to software application 24.

In some examples, for command stream 52 shown in FIG. 4, the timestamp values included in the timestamps returned by GPU driver 28 for each of the timestamp requests included in command stream 52 may be generated based on the equations listed in TABLE 1:

TABLE 1

Example equations for generating timestamp values

| TSV1 = TSVGPUA + (TSV1A − TSVGPUA) + (TSV1B − TSVGPUB) + (TSV1C − TSVGPUC) + (TSV1D − TSVGPUD) | (1) |
|---|---|
| TSV2 = TSVGPUA + (TSV2A − TSVGPUA) + (TSV2B − TSVGPUB) + (TSV2C − TSVGPUC) + (TSV2D − TSVGPUD) | (2) |
| TSV3 = TSVGPUA + (TSV3A − TSVGPUA) + (TSV3B − TSVGPUB) + (TSV3C − TSVGPUC) + (TSV3D − TSVGPUD) | (3) |
| TSV4 = TSVGPUA + (TSV4A − TSVGPUA) + (TSV4B − TSVGPUB) + (TSV4C − TSVGPUC) + (TSV4D − TSVGPUD) | (4) |

In TABLE 1, TSVx is a timestamp value for a timestamp that is generated in response to timestamp request TSRx, and TSVGPUx is a timestamp value that is generated in response to timestamp request TSRGPUx. For example, TSV1 is a timestamp value for a timestamp that is generated in response to timestamp request TSR1, TSV3B is a timestamp value for a timestamp that is generated in response to timestamp request TSR3B, etc. As another example, TSVGPUA is a timestamp value for a timestamp that is generated in response to timestamp request TSRGPUA, and TSVGPUB is a timestamp value for a timestamp that is generated in response to timestamp request TSRGPUB, etc.

In further examples, the timestamp values included in the timestamps returned by GPU driver 28 for each of the timestamps requests included in command stream 52 may be generated based on the following generic equation:

$$TSVx = TSVGPUA + (TSVxA - TSVGPUA) + (TSVxB - TSVGPUB) + (TSVxC - TSVGPUC) + (TSVxD - TSVGPUD) \quad (5)$$

where TSVx is a timestamp value for a timestamp that is generated in response to timestamp request TSRx, TSVxA is a timestamp value for a timestamp that is generated in response to timestamp request TSRxA, etc. In equation (5), x may be any integer.

In some examples, TSRxA, TSRxB, TSRxC, and TSRxD may be timestamp requests that are generated in response to receiving TSRx in command stream 52, and TSRGPUA, TSRGPUB, TSRGPUC, and TSRGPUD may be timestamp requests that are generated by GPU driver 28 at the start of respective rendering pass iterations.

In additional examples, CPU 6 and/or GPU 12 may generate one or more timestamp values based on the following equation:

$$\text{Value} = TSVGPU(0) + \sum_{y=0}^{N-1} (TSV(y) - TSVGPU(y)) \quad (6)$$

where Value is a timestamp value for a timestamp that is generated in response to a timestamp request received from a graphics application, TSV(y) is a per-bin timestamp value that is generated during the yth rendering pass iteration, TSVGPU(y) is a reference timestamp value that is generated prior to rendering any primitives for the yth rendering pass iteration, and N is the number of rendering pass iterations used to render the graphics frame. In some examples, equation (6) may be a generalized form of the equations in TABLE 1.

In some cases, each of the TSV(y) per-bin timestamp values may correspond to a respective one of a plurality of per-bin timestamp requests where each of the plurality of per-bin timestamp requests corresponds to and is generated in response to the timestamp request received from the graphics application that corresponds to Value.

In further examples, CPU 6 and/or GPU 12 may generate timestamp values for a plurality of timestamp requests included in a command stream received from a graphics application based on the following equation:

$$\text{Value}(x) = TSVGPU(0) + \sum_{y=0}^{N-1} (TSV(x, y) - TSVGPU(y)) \quad (7)$$

where Value(x) is a timestamp value for a timestamp that is generated in response to an xth timestamp request in a command stream received from a graphics application, TSV(x, y) is a per-bin timestamp value that is generated during the yth rendering pass iteration and that corresponds to and is generated in response to the xth timestamp request in the command stream, TSVGPU(y) is a reference timestamp value that is generated prior to rendering any primitives for the yth rendering pass iteration, and N is the number of rendering pass iterations used to render the graphics frame. In some cases, each of the TSV(x, y) per-bin timestamp values may correspond to a respective one of a plurality of per-bin timestamp requests where each of the plurality of per-bin timestamp requests corresponds to and is generated in response to the xth timestamp request in the command stream received from the graphics application. In some examples, equation (7) may be a generalized form of the equations in TABLE 1.

In some examples, for each of the timestamp requests included in a command stream received from a graphics application, GPU driver 28 may place a per-bin timestamp request into each of the per-bin command streams. In such examples, the order of the per-bin timestamp requests in each of the per-bin command streams may, in some examples, be the same as the order of the corresponding timestamp requests in the command stream received from the graphics application.

In further examples, the command stream received from the graphics application may include draw call commands and timestamp requests. In some cases, at least one of the timestamp requests may be positioned between at least two of the draw call commands in the command stream. In such examples, for each of the timestamp requests in the command stream received from the graphics application, GPU driver 28 may place a per-bin timestamp request into each of the per-bin command streams. In addition, for each of the draw call commands in the command stream received from the graphics application, GPU driver 28 may place a per-bin draw call into each of the per-bin command streams. In such examples, the order of the per-bin timestamp requests and the per-bin draw calls in each of the per-bin command streams may, in some examples, be the same as the order of the corresponding timestamp requests and the draw call commands in the command stream received from the graphics application.

In general, one or both of GPU driver 28 and GPU 12 may generate application-requested timestamps and/or application-requested timestamp values based on per-bin timestamp values. In some examples, GPU driver 28 may receive per-bin timestamp values from GPU 12, and generate the application-requested timestamps and/or timestamp values based on the per-bin timestamp values. In such examples, GPU driver 28 may, in some examples, generate the application-requested timestamps and/or timestamp values based on one or more of equations (1)-(7).

In further examples, GPU 12 may generate per-bin timestamp values, generate the application-requested timestamps and/or timestamp values based on the per-bin timestamp values, and provide the application-requested timestamps and/or timestamp values to GPU driver 28. In such examples, GPU 12 may, in some examples, generate the application-requested timestamps and/or timestamp values based on one or more of equations (1)-(7).

In additional examples, GPU 12 may generate per-bin timestamp values, generate one or more intermediate values based on the per-bin timestamp values, and provide the intermediate values to GPU driver 28. In such examples, GPU driver 28 may receive the intermediate values from GPU 12, and generate the application-requested timestamps and/or timestamp values based on the intermediate values.

In some cases, the intermediate values may correspond to one or more terms in equations (1)-(7). In additional cases, the intermediate values may correspond to any combination of the input variables specified in equations (1)-(7).

As shown in FIGS. 4-6, CPU 6 and/or GPU 12 may generate a timestamp value (e.g., the timestamp value corresponding to TSR2) that is indicative of a point in time based on a plurality of per-bin timestamp values (e.g., per-bin timestamp values corresponding to TSR2A, TSR2B, TSR2C, and TSR2D) that are generated by GPU 12 while performing tile-based rendering for a graphics frame. The timestamp value (e.g., the timestamp value corresponding to TSR2) may be a function of at least two per-bin timestamp values (e.g., per-bin timestamp values corresponding to TSR2A, TSR2B, TSR2C, and TSR2D) of the plurality of per-bin timestamp values.

In some examples, each of the plurality of per-bin timestamp values (e.g., per-bin timestamp values corresponding to TSR2A, TSR2B, TSR2C, and TSR2D) may be generated by GPU 12 during a respective one of a plurality of rendering pass iterations that occur while performing the tile-based rendering. For example, the per-bin timestamp value for TSR2A is generated by GPU 12 during rendering pass iteration A, the per-bin timestamp value for TSR2B is generated by GPU 12 during rendering pass iteration B, the per-bin timestamp value for TSR2C is generated by GPU 12 during rendering pass iteration C, and the per-bin timestamp value for TSR2D is generated by GPU 12 during rendering pass iteration D.

Each of the rendering pass iterations may, in some examples, be configured to render a respective one of a plurality of sub-regions of a render target. For example, rendering pass iteration A is configured to render bin A of the render target, rendering pass iteration B is configured to render bin B of the render target, rendering pass iteration C is configured to render bin C of the render target, and rendering pass iteration D is configured to render bin D of the render target.

In some examples, the at least two per-bin timestamp values that are used to generate the timestamp value (e.g., the timestamp value corresponding to TSR2) may include a first per-bin timestamp value (e.g., the timestamp value corresponding to TSR2A) and a second per-bin timestamp value (e.g., the timestamp value corresponding to TSR2B). The first per-bin timestamp value (e.g., the timestamp value corresponding to TSR2A) may be generated by GPU 12 during a first rendering pass iteration (e.g., rendering pass iteration A) of the plurality of rendering pass iterations. The second per-bin timestamp value (e.g., the timestamp value corresponding to TSR2B) may be generated by GPU 12 during a second rendering pass iteration (e.g., rendering pass iteration B) of the plurality of rendering pass iterations. The second rendering pass iteration (e.g., rendering pass iteration B) may be different than the first rendering pass iteration (e.g., rendering pass iteration A).

In further examples, the at least two per-bin timestamp values that are used to generate the timestamp value (e.g., the timestamp value corresponding to TSR2) may further include at least two reference timestamp values (e.g., timestamp values corresponding to TSRGPUA, TSRGPUB, TSRGPUC, TSRGPUD). Each of the at least two reference timestamp values may be generated during a respective one of the rendering pass iterations and prior to rendering any primitives for the respective one of the rendering pass iterations. For example, the timestamp value corresponding to TSRGPUA is generated during rendering pass iteration A and prior to rendering any primitives for rendering pass iteration A (e.g., prior to executing DRAW1A, DRAW2A, and DRAW3A).

In additional examples, CPU 6 and/or GPU 12 may generate the timestamp value (e.g., the timestamp value corresponding to TSR2) in response to a timestamp request (e.g., TSR2) that is positioned between at least two draw call commands (e.g., DRAW1, DRAW2) in an ordered sequence of commands to be executed for the graphics frame (command stream 52). In some examples, the timestamp value for TSR2 may be generated based on relative amounts of time taken by the draw call commands (e.g., DRAW1, DRAW2) in the ordered sequence of commands to execute during the rendering of the graphics frame.

In some examples, GPU 12 may perform a plurality of rendering pass iterations while performing tile-based rendering for a graphics frame. Each of the rendering pass iterations may be configured to perform at least two per-bin draw calls. For example, rendering pass iteration A may be configured to perform DRAW1A and DRAW2A. Each of the at least two per-bin draw calls may be associated with a respective one of the at least two draw call commands. For example, DRAW1A may be associated with DRAW1 in command stream 52, and DRAW2A may be associated with DRAW2 in command stream 52.

In such examples, the at least two per-bin timestamp values that are used to generate the timestamp value (e.g., the timestamp value corresponding to TSR2) may include a first per-bin timestamp value (e.g., the timestamp value corresponding to TSR2A) and a second per-bin timestamp value (e.g., the timestamp value corresponding to TSR2B). The first per-bin timestamp value (e.g., the timestamp value corresponding to TSR2A) may be indicative of a point in time that occurs between performance of the at least two per-bin draw calls (e.g., DRAW1A, DRAW2A) during a first rendering pass iteration (e.g., rendering pass iteration A) of the plurality of rendering pass iterations. The second per-bin timestamp value (e.g., the timestamp value corresponding to TSR2B) may be indicative of a point in time that occurs between performance of the at least two per-bin draw calls (e.g., DRAW1B, DRAW2B) during a second rendering pass iteration (e.g., rendering pass iteration B) of the plurality of rendering pass iterations. The second rendering pass iteration (e.g., rendering pass iteration B) may be different than the first rendering pass iteration (e.g., rendering pass iteration A).

In further examples, each of the plurality of per-bin timestamp values (e.g., per-bin timestamp values corresponding to TSR2A, TSR2B, TSR2C, and TSR2D) may be generated in response to a respective one of a plurality of per-bin timestamp requests (e.g., TSR2A, TSR2B, TSR2C, and TSR2D, respectively). In such examples, each of the per-bin timestamp requests (e.g., TSR2A, TSR2B, TSR2C, and TSR2D) may be placed into a respective one of a plurality of command streams (e.g., command streams 56, 58, 60 and 62, respectively). Each of the command streams (e.g., command streams 56, 58, 60 and 62, respectively) may be executed by GPU 12 during a respective one of a plurality of rendering pass iterations (e.g., rendering pass iterations A, B, C, and D, respectively) that occur while performing tile-based rendering. Each of the rendering pass iterations (e.g., rendering pass iterations A, B, C, and D) may be configured to render a respective one of a plurality of sub-regions of a render target (e.g., bin A, B, C, and D, respectively).

In some examples, CPU 6 and/or GPU 12 may generate a plurality of timestamp values (e.g., timestamp values corresponding to TSR1, TSR2, TSR3, TSR4) based on the plurality of per-bin timestamp values (e.g., per-bin timestamp values corresponding to TSR1A-TSR1D, TSR2A-TSR2D, TSR3A-TSR3D, TSR4A-TSR4D). Each of the timestamp values (e.g., timestamp values corresponding to TSR1, TSR2, TSR3, TSR4) may correspond to a respective one of a plurality of timestamp requests (e.g., TSR1, TSR2, TSR3, TSR4, respectively) included in an ordered sequence of commands (e.g., command stream 52) to be executed for the graphics frame. Each of the timestamp requests may be requested by a graphics application.

In such examples, at least two of the timestamp requests (e.g., TSR2 and TSR3) may, in some examples, be positioned between respective pairs of consecutive draw call commands (e.g., DRAW1/DRAW2, DRAW2/DRAW3, respectively) in the ordered sequence of commands (e.g., command stream 52) to be executed for the graphics frame. In such examples, CPU 6 and/or GPU 12 may generate the plurality of timestamp values (e.g., timestamp values corresponding to TSR1, TSR2, TSR3, TSR4) based on the per-bin timestamp values such that the timestamp values returned for the timestamp requests in the ordered sequence of commands monotonically increase in value from the beginning of the ordered sequence of commands (e.g., command stream 52) to the end of the ordered sequence of commands (e.g., command stream 52). For example, TSR1 may be less than or equal to TSR2, which may be less than or equal to TSR3, which may be less than or equal to TSR4.

In such examples, the plurality of timestamp values (e.g., timestamp values corresponding to TSR1, TSR2, TSR3, TSR4) may, in some examples, indicative of relative amounts of time taken by draw call commands (e.g., DRAW1, DRAW2, DRAW3) in the ordered sequence of commands (e.g., command stream 52) to execute during the rendering of the graphics frame. For example, if the amount of time taken by DRAW1 to execute during the rendering of the graphics frame is greater than the amount of time taken by DRAW2 to execute during the rendering of the graphics frame, then the difference between TSR2 and TSR1 may, in such examples, be greater than the difference between TSR3 and TSR2.

In some cases, the amount of time taken by DRAW1 to execute during the rendering of the graphics frame may correspond to the aggregate amount of time taken for each of the per-bin draw call commands associated with DRAW1 to execute during the rendering of the graphics frame, and the amount of time taken by DRAW2 to execute during the rendering of the graphics frame may correspond to the aggregate amount of time taken for each of the per-bin draw call commands associated with DRAW2 to execute during the rendering of the graphics frame. For example, the amount of time taken by DRAW1 to execute during the rendering of the graphics frame may be equal to the sum of the amounts of time taken by DRAW1A, DRAW1B, DRAW1C, and DRAW1D to execute, and the amount of time taken by DRAW2 to execute during the rendering of the graphics frame may be equal to the sum of the amounts of time taken by DRAW2A, DRAW2B, DRAW2C, and DRAW2D to execute.

In some examples, GPU driver 28 may receive a timestamp request (e.g., TSR2) from a graphics application (e.g., software application 24). GPU driver 28 may generate a plurality of per-bin timestamp requests (e.g., TSR2A, TSR2B, TSR2C, TSR2D) based on the timestamp request (e.g., TSR2). GPU driver 28 may place each of the per-bin timestamp requests (e.g., TSR2A, TSR2B, TSR2C, TSR2D) into a respective one of a plurality of command streams (e.g., command streams 56, 58, 60, and 62, respectively). Each of the command streams (e.g., command streams 56, 58, 60, 62) may be executed by GPU 12 during a respective one of a plurality of rendering pass iterations (e.g., rendering pass iterations A, B, C, and D, respectively) that occur while performing tile-based rendering. Each of the rendering pass iterations (e.g., rendering pass iterations A, B, C, D) may be configured to render a respective one of a plurality of sub-regions of a render target (e.g., bins A, B, C, and D, respectively).

GPU driver 28 may cause GPU 12 to execute the command streams (e.g., command streams 56, 58, 60, 62). GPU driver 28 and/or GPU 12 may generate the timestamp value (e.g., TSR2) based on the per-bin timestamp values generated by GPU 12 in response to the per-bin timestamp requests (e.g., TSR2A, TSR2B, TSR2C, TSR2D) placed into the command streams.

FIGS. 4-6 depict an example command stream that includes three draw call commands for rendering a graphics frame and an example tile-based rendering system that subdivides a render target into four different sub-regions or bins. It should be understood, however, that the techniques described in this disclosure may be implemented with command streams that include the same or a different number of draw call commands for each graphics frame to be rendered and with tile-based rendering systems that subdivide a graphics frame into the same or a different number of sub-regions or bins.

In some examples, a binning pass may be performed prior to the rendering pass iterations illustrated in FIG. 5. In such examples, the binning pass may be treated in a similar fashion to the rendering pass iterations (e.g., "Rendering Pass Iteration A"). In such examples, GPU driver 28 and/or GPU 12 may generate the one or more timestamps based on one or more per-binning pass timestamps that are requested during a binning pass and based on one or more per-bin timestamp requests that are requested during one or more iterations of a rendering pass.

In some examples, GPU driver 28 and/or GPU 12 may generate a plurality of timestamp values in response to a plurality of timestamp requests for a graphics frame to be rendered such that at least one of the timestamp values for the graphics frame to be rendered is different than at least one other of the timestamp values for the graphics frame to be rendered. In further examples, GPU driver 28 and/or GPU 12 may generate a plurality of timestamp values in response to a plurality of timestamp requests for a graphics frame to be rendered such that the timestamp values monotonically increase from the beginning of a command stream for the graphics frame to be rendered to the end of the command stream for the graphics frame to be rendered.

Figure 7:
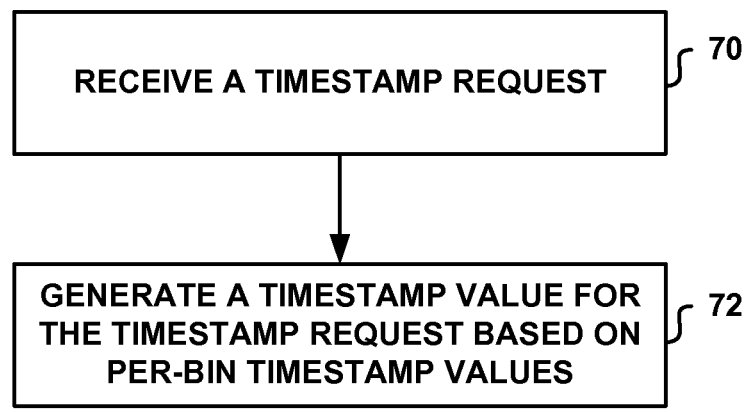
FIG. 7 is a flow diagram illustrating an example technique for supporting intra-frame timestamps in a graphics processing system that performs tile-based rendering according to this disclosure.

FIG. 7 is a flow diagram illustrating an example technique for supporting intra-frame timestamps in a graphics processing system that performs tile-based rendering according to this disclosure. CPU 6 and/or GPU 12 receives a timestamp request (70). In some examples, the timestamp request may be received from a graphics application executing on CPU 6. CPU 6 and/or GPU 12 generates a timestamp value that is indicative of a point in time based on a plurality of per-bin timestamp values that are generated by GPU 12 while performing tile-based rendering for a graphics frame (72). The timestamp value may be a function of at least two per-bin timestamp values of the plurality of per-bin timestamp values.

CPU 6 and/or GPU 12 may use any of the techniques described in this disclosure for generating the timestamp value. In some examples, CPU 6 and/or GPU 12 may generate the timestamp value based on one or more of equations (1)-(7). Using per-bin timestamp values to generate the timestamp values may allow intra-frame timestamp requests to be supported by a graphics processing system that performs tile-based rendering.

Figure 8:
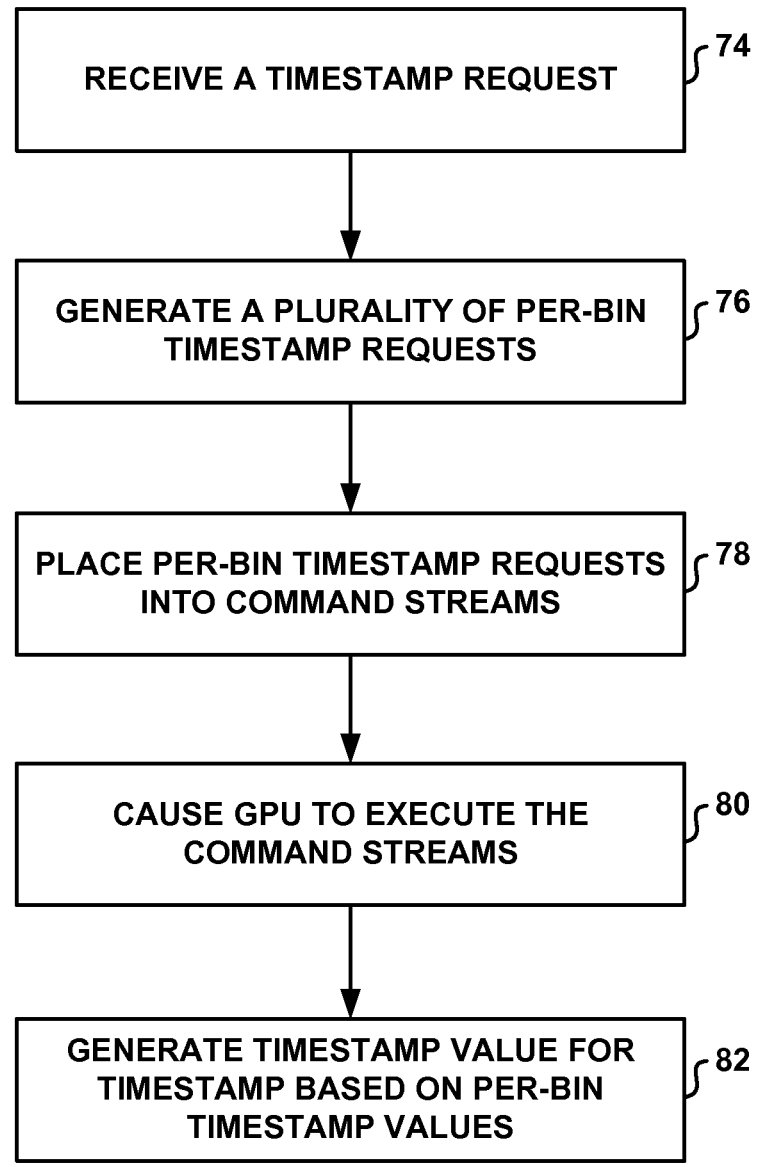
FIG. 8 is a flow diagram illustrating another example technique for supporting intra-frame timestamps in a graphics processing system that performs tile-based rendering according to this disclosure.

FIG. 8 is a flow diagram illustrating another example technique for supporting intra-frame timestamps in a graphics processing system that performs tile-based rendering according to this disclosure. In some examples, some or all of the technique illustrated in FIG. 8 may be used to perform some or all of the technique illustrated in FIG. 7.

CPU 6 receives a timestamp request (74). In some examples, the timestamp request may be received from a graphics application executing on CPU 6. CPU 6 generates a plurality of per-bin timestamp requests based on the timestamp request (76). CPU 6 places each of the per-bin timestamp requests into a respective one of a plurality of command streams (78). Each of the command streams may be executed by GPU 12 during a respective one of a plurality of rendering pass iterations that occur while performing tile-based rendering. Each of the rendering pass iterations may be configured to render a respective one of a plurality of sub-regions of a render target.

CPU 6 causes GPU 12 to execute the command streams (80). CPU 6 and/or GPU 12 generate the timestamp value based on the per-bin timestamp values generated by GPU 12 in response to the per-bin timestamp requests placed into the command streams (82). CPU 6 and/or GPU 12 may use any of the techniques described in this disclosure for generating the timestamp value. In some examples, CPU 6 and/or GPU 12 may generate the timestamp value based on one or more of equations (1)-(7).

Using per-bin timestamp values that are generated during different rendering pass iterations may allow a graphics processing system to generate application-requested timestamp values that reflect, at least to some degree, the relative amounts of time taken by different draw call commands to execute during the rendering of a graphics frame. In this way, the techniques described in this disclosure may allow a tile-based rendering system to support intra-frame timestamps, even in cases where the tile-based rendering system executes draw call commands in a non-continuous, interleaved manner.

Accurate intra-frame timestamps, which do not themselves incur a performance penalty, may be difficult to obtain on tile-based rendering architectures. This is even more difficult on drivers which can dynamically switch between binning and direct rendering. In some examples, the techniques of this disclosure may implement a reasonably accurate, representative, intra-frame timestamp, which may work for both binning and direct rendering.

In some examples, each timestamp request may be changed into a per-bin timestamp. After the rendering for a given render target has been processed, the average time from bin-start until timestamp for each bin may be generated and used as a timestamp. This may provide a timestamp equivalent to those produced by direct rendering components. The techniques of this disclosure may allow a tile-based rendering GPU to support intra-frame timestamps.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
    processing, by one or more processors, a timestamp request from a graphics application executing on a central processing unit (CPU);
    generating, with at least one of the one or more processors, a plurality of per-bin timestamp requests in response to the timestamp request;
    generating, with a graphics processing unit (GPU), a plurality of per-bin timestamp values in response to the plurality of per-bin timestamp requests during a plurality of rendering pass iterations that occur while performing tile-based rendering for a graphics frame; and
    generating, with at least one of the one or more processors, a timestamp value that is indicative of a point in time based on the plurality of per-bin timestamp values,
        wherein generating the timestamp value comprises executing a function of at least two per-bin timestamp values of the plurality of per-bin timestamp values, and
        wherein executing the function comprises adding an initial reference timestamp that is generated by the GPU prior to rendering any primitives for an initial rendering pass iteration to a summation of the differences between respective per-bin timestamp values and respective reference timestamp values for two or more rendering pass iterations used to render the graphics frame.

2. The method of claim 1, wherein each of the rendering pass iterations renders a respective one of a plurality of sub-regions of a render target.

3. The method of claim 1, wherein generating the plurality of per-bin timestamp values comprises:

generating a first per-bin timestamp value during a first rendering pass iteration of the plurality of rendering pass iterations, and generating a second per-bin timestamp value during a second rendering pass iteration of the plurality of rendering pass iterations, the second rendering pass iteration being different than the first rendering pass iteration, wherein the at least two per-bin timestamp values comprise the first and second per-bin timestamp values.

4. The method of claim 3, further comprising generating, with the GPU, a first or second reference timestamp value respectively associated with the first or second per-bin timestamp value during a respective one of the rendering pass iterations and prior to rendering any primitives for the respective one of the rendering pass iterations.

5. The method of claim 1, wherein executing the function comprises solving the following equation:

$$\text{Value} = TSVGPU(0) + \sum_{y=0}^{N-1} (TSV(y) - TSVGPU(y))$$

where Value is the timestamp value, TSV(y) is the respective per-bin timestamp value that is generated during a yth rendering pass iteration, TSVGPU(y) is the respective reference timestamp value that is generated by the GPU prior to rendering any primitives for the yth rendering pass iteration, and N is a total number of rendering pass iterations used to render the graphics frame.

6. The method of claim 1, further comprising generating the timestamp value in response to the timestamp request being positioned between at least two draw call commands in an ordered sequence of commands to be executed for the graphics frame.

7. The method of claim 6, further comprising performing, by the GPU, the a plurality of rendering pass iterations while performing tile-based rendering for the graphics frame, wherein the at least two per-bin timestamp values comprise a first per-bin timestamp value and a second per-bin timestamp value, wherein the first per-bin timestamp value is indicative of a point in time that occurs between performance of at least two per-bin draw calls that are performed during a first rendering pass iteration of the plurality of rendering pass iterations, each of the at least two per-bin draw calls that are performed during the first rendering pass iteration being associated with a respective one of the at least two draw call commands, and wherein the second per-bin timestamp value is indicative of a point in time that occurs between performance of at least two per-bin draw calls that are performed during a second rendering pass iteration of the plurality of rendering pass iterations, each of the at least two per-bin draw calls that are performed during the second rendering pass iteration being associated with a respective one of the at least two draw call commands, the second rendering pass iteration being different than the first rendering pass iteration.

8. The method of claim 1, further comprising:

generating each of the plurality of per-bin timestamp values in response to a respective one of a plurality of per-bin timestamp requests, each of the per-bin timestamp requests being placed into a respective one of a plurality of command streams; and executing, by the GPU, each of the command streams during a respective one of a plurality of rendering pass iterations that occur while performing tile-based rendering, each rendering pass iteration rendering one of a plurality of sub-regions of a render target.

9. The method of claim 1, wherein generating the timestamp value comprises:

generating a plurality of timestamp values based on the plurality of per-bin timestamp values, each of the timestamp values corresponding to a respective one of a plurality of timestamp requests included in an ordered sequence of commands to be executed for the graphics frame, each of the timestamp requests being requested by the graphics application.

10. The method of claim 9, wherein at least two of the timestamp requests are positioned between respective pairs of consecutive draw call commands in the ordered the ordered sequence of commands to be executed for the graphics frame, and wherein generating the plurality of timestamp values comprises generating the plurality of timestamp values based on the per-bin timestamp values such that the timestamp values returned for the timestamp requests in the ordered sequence of commands monotonically increase in value from the beginning of the ordered sequence of commands to the end of the ordered sequence of commands.

11. The method of claim 9, wherein the plurality of timestamp values are indicative of relative amounts of time taken by draw call commands in the ordered sequence of commands to execute during the rendering of the graphics frame.

12. The method of claim 9, wherein generating the plurality of timestamp values comprises generating the plurality of timestamp values based on the following equation:

$$\text{Value}(x) = TSVGPU(0) + \sum_{y=0}^{N-1} (TSV(x, y) - TSVGPU(y))$$

where Value(x) is a timestamp value for a timestamp that is generated in response to an xth timestamp request in the ordered sequence of commands, TSV(x, y) is a per-bin timestamp value that is generated during the yth rendering pass iteration and that corresponds to the xth timestamp request in the ordered sequence of commands, TSVGPU(y) is a reference timestamp value that is generated by the GPU prior to rendering any primitives for the yth rendering pass iteration, and N is the number of rendering pass iterations used to render the graphics frame.

13. The method of claim 1, wherein generating the timestamp value comprises:

placing each of the per-bin timestamp requests into a respective one of a plurality of command streams;

executing, by the GPU, each of the command streams during a respective one of a plurality of rendering pass iterations that occur while performing tile-based rendering, each rendering pass iteration rendering one of a plurality of sub-regions of a render target; and generating the timestamp value based on the per-bin timestamp values generated by the GPU in response to the per-bin timestamp requests placed into the command streams.

14. The method of claim 1, wherein the one or more processors comprise the central processing unit (CPU).

15. The method of claim 1, wherein the one or more processors comprise the GPU.

16. A device comprising:
one or more processors configured to process a timestamp request from a graphics application executing on a central processing unit (CPU) and generate a plurality of per-bin timestamp requests in response to the timestamp request;
a graphics processing unit (GPU) coupled to at least one of the one or more processors, the GPU being configured to generate a plurality of per-bin timestamp values in response to the plurality of per-bin timestamp requests during a plurality of rendering pass iterations that occur while performing tile-based rendering for a graphics frame; and
wherein at least one of the one or more processors is further configured to generate a timestamp value that is indicative of a point in time based on the plurality of per-bin timestamp values,
wherein to generate the timestamp value, the one or more processors are configured to execute a function of at least two per-bin timestamp values of the plurality of per-bin timestamp values, and
wherein to execute the function, the one or more processors are configured to add an initial reference timestamp that is generated by the GPU prior to rendering any primitives for an initial rendering pass iteration to a summation of the differences between respective per-bin timestamp values and respective reference timestamp values for two or more rendering pass iterations used to render the graphics frame.

17. The device of claim 16, wherein each of the rendering pass iterations renders a respective one of a plurality of sub-regions of a render target.

18. The device of claim 16, wherein to generate the timestamp, the one or more processors are configured to:
generate a first per-bin timestamp value during a first rendering pass iteration of the plurality of rendering pass iterations, and
generate a second per-bin timestamp value during a second rendering pass iteration of the plurality of rendering pass iterations, the second rendering pass iteration being different than the first rendering pass iteration, wherein the at least two per-bin timestamp values comprise the first and second per-bin timestamp values.

19. The device of claim 18, wherein the is further configured to generate a first or second reference timestamp value respectively associated with the first or second per-bin timestamp value during a respective one of the rendering pass iterations and prior to rendering any primitives for the respective one of the rendering pass iterations.

20. The device of claim 16, wherein to execute the function, the one or more processors are configured to solve the following equation:

$$\text{Value} = TSVGPU(0) + \sum_{y=0}^{N-1} (TSV(y) - TSVGPU(y))$$

where Value is the timestamp value, TSV(y) is the respective per-bin timestamp value that is generated during a yth rendering pass iteration, TSVGPU(y) is the respective reference timestamp value that is generated by the GPU prior to rendering any primitives for the yth rendering pass iteration, and N is a total number of rendering pass iterations used to render the graphics frame.

21. The device of claim 16, wherein the one or more processors are further configured to generate the timestamp value in response to the timestamp request being positioned between at least two draw call commands in an ordered sequence of commands to be executed for the graphics frame.

22. The device of claim 21,
wherein the GPU is configured to perform a plurality of rendering pass iterations while performing tile-based rendering for the graphics frame,
wherein the at least two per-bin timestamp values comprise a first per-bin timestamp value and a second per-bin timestamp value,
wherein the first per-bin timestamp value is indicative of a point in time that occurs between performance of at least two per-bin draw calls that are performed during a first rendering pass iteration of the plurality of rendering pass iterations, each of the at least two per-bin draw calls that are performed during the first rendering pass iteration being associated with a respective one of the at least two draw call commands, and
wherein the second per-bin timestamp value is indicative of a point in time that occurs between performance of at least two per-bin draw calls that are performed during a second rendering pass iteration of the plurality of rendering pass iterations, each of the at least two per-bin draw calls that are performed during the second rendering pass iteration being associated with a respective one of the at least two draw call commands, the second rendering pass iteration being different than the first rendering pass iteration.

23. The device of claim 16, wherein the one or more processors are further configured to generate each of the plurality of per-bin timestamp values in response to a respective one of a plurality of per-bin timestamp requests, each of the per-bin timestamp requests being placed into a respective one of a plurality of command streams, and wherein the GPU is configured to execute each of the command streams during a respective one of a plurality of rendering pass iterations that occur while performing tile-based rendering, each rendering pass iteration rendering a respective one of a plurality of sub-regions of a render target.

24. The device of claim 16, wherein the one or more processors are further configured to generate a plurality of timestamp values based on the plurality of per-bin timestamp values, each of the timestamp values corresponding to a respective one of a plurality of timestamp requests included in an ordered sequence of commands to be executed for the graphics frame, each of the timestamp requests being requested by the graphics application.

25. The device of claim 24,
wherein at least two of the timestamp requests are positioned between respective pairs of consecutive draw call commands in the ordered the ordered sequence of commands to be executed for the graphics frame, and
wherein the one or more processors are further configured to generate the plurality of timestamp values based on the per-bin timestamp values such that the timestamp values returned for the timestamp requests in the ordered sequence of commands monotonically increase in value from the beginning of the ordered sequence of commands to the end of the ordered sequence of commands.

26. The device of claim 24, wherein the plurality of timestamp values are indicative of relative amounts of time taken by draw call commands in the ordered sequence of commands to execute during the rendering of the graphics frame.

27. The device of claim 24, wherein the one or more processors are further configured to generate the plurality of timestamp values based on the following equation:

$$\text{Value}(x) = TSVGPU(0) + \sum_{y=0}^{N-1} (TSV(x, y) - TSVGPU(y))$$

where Value(x) is a timestamp value for a timestamp that is generated in response to an xth timestamp request in the ordered sequence of commands, TSV(x, y) is a per-bin timestamp value that is generated during the yth rendering pass iteration and that corresponds to the xth timestamp request in the ordered sequence of commands, TSVGPU(y) is a reference timestamp value that is generated by the GPU prior to rendering any primitives for the yth rendering pass iteration, and N is the number of rendering pass iterations used to render the graphics frame.

28. The device of claim 16, wherein the one or more processors are further configured to:
place each of the per-bin timestamp requests into a respective one of a plurality of command streams, each of the command streams configured to be executed by the GPU during a respective one of a plurality of rendering pass iterations that occur while performing tile-based rendering, each rendering pass iteration rendering a respective one of a plurality of sub-regions of a render target;
cause the GPU to execute the command streams; and
generate the timestamp value based on the per-bin timestamp values generated by the GPU in response to the per-bin timestamp requests placed into the command streams.

29. The device of claim 16, wherein the one or more processors comprise at least of a portion of the CPU.

30. The device of claim 16, wherein the one or more processors comprise the GPU.

31. The device of claim 16, wherein the device comprises a wireless communication device.

32. The device of claim 16, wherein the device comprises a mobile phone handset.

33. An apparatus comprising:
means for processing a timestamp request from a graphics application executing on a central processing unit (CPU);
means for generating a plurality of per-bin timestamp requests in response to the timestamp request;
means for generating a plurality of per-bin timestamp values in response to the plurality of per-bin timestamp requests during a plurality of rendering pass iterations that occur while performing tile-based rendering for a graphics frame; and
means for generating a timestamp value that is indicative of a point in time based on the plurality of per-bin timestamp values,
wherein the means for generating the timestamp value comprises means for executing a function of at least two per-bin timestamp values of the plurality of per-bin timestamp values, and
wherein the means for executing the function comprises means for adding an initial reference timestamp that is generated by the GPU prior to rendering any primitives for an initial rendering pass iteration to a summation of the differences between respective per-bin timestamp values and respective reference timestamp values for two or more rendering pass iterations used to render the graphics frame.

34. The apparatus of claim 33, wherein each of the rendering pass iterations renders a respective one of a plurality of sub-regions of a render target.

35. The apparatus of claim 33,
wherein the means for generating the plurality of per-bin timestamp values comprises:
means for generating a first per-bin timestamp value during a first rendering pass iteration of the plurality of rendering pass iterations, and
means for generating a second per-bin timestamp value during a second rendering pass iteration of the plurality of rendering pass iterations, the second rendering pass iteration being different than the first rendering pass iteration, wherein the at least two per-bin timestamp values comprise the first and second per-bin timestamp values.

36. The apparatus of claim 33, wherein the means for executing the function comprise means for solving the following equation:

$$\text{Value} = TSVGPU(0) + \sum_{y=0}^{N-1} (TSV(y) - TSVGPU(y))$$

where Value is the timestamp value, TSV(y) is the respective per-bin timestamp value that is generated during a yth rendering pass iteration, TSVGPU(y) is the respective reference timestamp value that is generated by the GPU prior to rendering any primitives for the yth rendering pass iteration, and N is the number of rendering pass iterations used to render the graphics frame.

37. The apparatus of claim 33, wherein the means for generating the timestamp value comprises at least one of the CPU or the GPU.

38. A non-transitory computer readable storage medium comprising instructions that upon execution by one or more processors cause the one or more processors to:
process a timestamp request from a graphics application executing on a central processing unit (CPU);
generate a plurality of per-bin timestamp requests in response to the timestamp request;
generate a plurality of per-bin timestamp values in response to the plurality of per-bin timestamp requests during a plurality of rendering pass iterations that occur while performing tile-based rendering for a graphics frame; and
generate a timestamp value that is indicative of a point in time based on the plurality of per-bin timestamp values,
wherein the instructions that cause the one or more processors to generate the timestamp value comprise instructions that, upon execution, cause the one or more processors to execute a function of at least two per-bin timestamp values of the plurality of per-bin timestamp values, and
wherein the instructions that cause the one or more processors to execute the function comprise instructions that, upon execution, cause the one or more processors to add an initial reference timestamp that is generated by the GPU prior to rendering any primitives for an initial rendering pass iteration to a summation of the differences between respective per-bin timestamp values and respective reference timestamp values for two or more rendering pass iterations used to render the graphics frame.

39. The non-transitory computer readable storage medium of claim 38, wherein each of the rendering pass iterations renders a respective one of a plurality of sub-regions of a render target.

40. The non-transitory computer readable storage medium of claim 38,
wherein the instructions that cause the one or more processors to generate the plurality of per-bin timestamp values comprises:
instructions that upon execution cause the one or more processors to generate a first per-bin timestamp value during a first rendering pass iteration of the plurality of rendering pass iterations, and
instructions that upon execution cause the one or more processors to generate a second per-bin timestamp value during a second rendering pass iteration of the plurality of rendering pass iterations, the second rendering pass iteration being different than the first rendering pass iteration, wherein the at least two per-bin timestamp values comprise the first and second per-bin timestamp values.

41. The non-transitory computer readable storage medium of claim 38, wherein the instructions that cause the one or more processors to execute the function comprise instructions that, upon execution, cause the one or more processors to solve the following equation:

$$\text{Value} = TSVGPU(0) + \sum_{y=0}^{N-1} (TSV(y) - TSVGPU(y))$$

where Value is the timestamp value, $TSV(y)$ is the respective per-bin timestamp value that is generated during a yth rendering pass iteration, $TSVGPU(y)$ is the respective reference timestamp value that is generated by the GPU prior to rendering any primitives for the yth rendering pass iteration, and N is the number of rendering pass iterations used to render the graphics frame.

42. The non-transitory computer readable storage medium of claim 38, wherein the one or more processors comprise at least one of the CPU or the GPU.

\* \* \* \* \*

UNITED STATES PATENT AND TRADEMARK OFFICE
CERTIFICATE OF CORRECTION

PATENT NO.        : 9,449,410 B2
APPLICATION NO.   : 14/044396
DATED             : September 20, 2016
INVENTOR(S)       : Christopher Paul Frascati, Hitendra Mohan Gangani and Avinash Seetharamaiah It is certified that error appears in the above-identified patent and that said Letters Patent is hereby corrected as shown below:

In the Claims

Claim 7, Column 33, Lines 40-41, "the a plurality of rendering pass iterations" should be changed to --the plurality of rendering pass iterations--.

Claim 10, Column 34, Line 20, "the ordered the ordered sequence" should be changed to --the ordered sequence--.

Claim 19, Column 35, Lines 50-51, "the is further configured to" should be changed to --the GPU is further configured to--.

Claim 25, Column 36, Line 58, "the ordered the ordered sequence" should be changed to --the ordered sequence--.

Claim 29, Column 37, Line 43, "at least of a portion of the CPU" should be changed to --at least a portion of the CPU--.

Claim 36, Column 38, Line 27, "comprise" should be changed to --comprises--.

Claim 40, Column 39, Line 16, "comprises" should be changed to --comprise--.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*